United States Patent
Chen et al.

(10) Patent No.: US 12,197,362 B2
(45) Date of Patent: Jan. 14, 2025

(54) BATCH MATRIX MULTIPLICATION OPERATIONS IN A MACHINE LEARNING ACCELERATOR

(71) Applicant: Meta Platforms, Inc., Menlo Park, CA (US)

(72) Inventors: Yu Hsin Chen, Santa Clara, CA (US); Liangzhen Lai, Fremont, CA (US); Kyong Ho Lee, Los Altos, CA (US); Harshit Khaitan, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 162 days.

(21) Appl. No.: 18/159,988

(22) Filed: Jan. 26, 2023

(65) Prior Publication Data
US 2024/0256475 A1  Aug. 1, 2024

(51) Int. Cl.
*G06F 13/28* (2006.01)
*G06F 17/16* (2006.01)

(52) U.S. Cl.
CPC .............. *G06F 13/28* (2013.01); *G06F 17/16* (2013.01)

(58) Field of Classification Search
CPC .................................. G06N 10/40; G06F 10/80
See application file for complete search history.

(56) References Cited

U.S. PATENT DOCUMENTS

| | | | |
|---|---|---|---|
| 12,001,893 B1 * | 6/2024 | Khaitan | G06F 8/433 |
| 2022/0083844 A1 * | 3/2022 | Khaitan | G06N 3/063 |
| 2022/0207345 A1 * | 6/2022 | Khaitan | G06N 3/063 |
| 2023/0206104 A1 * | 6/2023 | Rab | G06N 10/40 |
| | | | 716/100 |
| 2024/0281253 A1 * | 8/2024 | Lee | G06F 9/30178 |

* cited by examiner

*Primary Examiner* — Getente A Yimer
(74) *Attorney, Agent, or Firm* — Greenberg Traurig, LLP

(57) ABSTRACT

In one embodiment, a method includes, determining that a bmm operation between a first activation tensor and a second activation tensor needs to be performed, collecting the second activation tensor in two blocks from activation buffers of N tensor processor units, splitting each of the two blocks of the second activation tensor into an MSB tile and an LSB tile, loading the second activation tensor to weight buffers of the N tensor processor units by filling a first entry of each weight buffer of each of the N tensor processor units with contents of the MSB tiles of the two blocks and filling a second entry of the weight buffer with contents of the LSB tiles of the two blocks, and generating a bmm result using the first activation tensor distributed in the activation buffers and the second activation tensor in the weight buffers.

20 Claims, 27 Drawing Sheets

BATCH MATRIX MULTIPLICATION OPERATIONS IN A MACHINE LEARNING ACCELERATOR

TECHNICAL FIELD

This disclosure generally relates to computing systems for accelerating machine learning computations and, more particularly, to batch matrix multiplications.

BACKGROUND

Neural networks are increasingly being used to implement machine learning (ML) techniques to solve a wide variety of problems including, but not limited to, object identification, feature classification, or content-driven image processing. Recently, computer processing devices specifically designed to accelerate ML calculations have been introduced. Those computer processing devices may be referred to as ML accelerators. Some neural networks, which may be referred to as convolutional neural networks, include one or more convolutional layers. In a convolutional neural network (CNN), the convolutional layers typically account for the vast majority of the computations performed and the data movement within the CNN and/or between the CNN and other elements of an ML model, making them a performance bottleneck. Some other neural networks, which may be referred to as Transformer networks, include self-attention layers. The self-attention layers may also require significant computations and data movement within the self-attention layers and/or between the self-attention layers and other elements of an ML model. Therefore, existing ML accelerators focus on using high compute parallelism along with an optimized data orchestration throughout the memory hierarchy to speed up the processing of convolutional layers or self-attention layers. However, existing ML accelerators may not perform well when implemented within edge devices that have strict power consumption constraints and that run inference exercises using previously trained models in real time. For example, existing ML accelerators may not perform well within artificial reality systems for virtual reality (VR), augmented reality (AR), mixed reality (MR), or hybrid reality implemented on standalone head-mounted displays (e.g., on AR/VR headsets), mobile devices or other edge computing devices.

SUMMARY OF PARTICULAR EMBODIMENTS

Particular embodiments described herein relate to systems and methods for performing a batch matrix multiplication between two activation tensors in a machine learning accelerator. A machine-learning accelerator may be designed for computing CNN/Multilayer Perceptron (MLP) types of workloads, where Multiply-and-Accumulate (MAC)/General Matrix Multiplication (GEMM) operators are between offline-trained weights and runtime-generated activations. A typical MAC unit used by a machine learning accelerator may be designed to compute a multiplication between an eight-byte input activation vector with a 32-byte 8-by-8 weight matrix, where each element of the weight matrix is 4 bits. As machine-learning models that use the attention mechanism are emerging, evolving the machine-learning accelerator architecture and software toolchain to support activation to activation multiplications becomes critical. Particular embodiments described herein may provide a way to reuse the weight matrix for a second activation tensor for a bmm operation.

In particular embodiments, a computing system for accelerating machine-learning computations may comprise a plurality of tensor processor clusters and an instruction master that provides instructions operable when executed by the plurality of tensor processor clusters. Each of the plurality of tensor processor clusters may comprise a plurality of tensor processor units, an activation DMA, and a weight DMA. The computing system may determine that a batch matrix multiplication (bmm) operation between a first activation tensor and a second activation tensor needs to be performed. The first activation tensor and the second activation tensor may be distributed in activation buffers of N tensor processor units. In particular embodiments, the first activation tensor and the second activation tensor may be output of respective operations that are performed by the N tensor processor units in distributed manners. The weight DMA of the computing system may collect the second activation tensor from the activation buffers of the N tensor processor units. The collected second activation tensor may be in two blocks. The weight DMA of the computing system may split each of the two blocks of the second activation tensor into a most significant bits (MSB) tile and a least significant bits (LSB) tile. The MSB tile may comprise most significant four bits of each byte in the block. The LSB tile may comprise least significant four bits of each byte in the block. The weight DMA of the computing system may load the second activation tensor to weight buffers of the N tensor processor units by filling a first entry of each weight buffer of each of the N tensor processor units with contents of the MSB tiles of the two blocks and filling a second entry of the weight buffer with contents of the LSB tiles of the two blocks. Each of the N tensor processor units may produce a first output of the bmm operation by performing a multiplication between a distributed part of the first activation tensor in the activation buffer and the first entry of the weight buffer. Each of the N tensor processor units may produce a second output of the bmm operation by performing a multiplication between the distributed part of the first activation tensor in the activation buffer and the second entry of the weight buffer. Each of the N tensor processor units may shift the first output by four bits. Each of the N tensor processor units may generate a part of a bmm result by accumulating the shifted first output and the second output.

In particular embodiments, the computing system may determine that the first activation tensor needs to be transposed before the bmm operation is performed. Each of the N tensor processor units may divide the distributed part of the first activation tensor in the activation buffer into N tiles along a dimension of the first activation tensor, where N is a number of tensor processor units to perform the bmm in a distributed manner. Each of the N tensor processor units may determine a corresponding destination tensor processor unit for each of the N tiles. A cluster activation DMA corresponding to a source tensor processor unit may transmit each of the N tiles from the source tensor processor unit to the corresponding destination tensor processor unit. The cluster activation DMA may transpose the tile using a transpose buffer. In particular embodiments, the source tensor processor unit and the destination tensor processor unit may be identical to each other. In such a case, the tile may be read from a location in the activation buffer into the transpose buffer and the tile in a transposed form may be written back to the location in the activation buffer. In particular embodiments, two tiles may be swapped with each other. In such a case, the tiles may be temporarily stored at a temporary location in the activation buffer of a respective destination tensor processor unit. A size of the temporary location may equal to a transpose buffer size. In particular embodiments, the two tiles to be swapped are from source tensor processor units of different source tensor processor clusters. In such a case, two cluster activation DMAs corresponding to the source tensor processor units may be synchronized at a granularity of a transpose buffer size.

Each of the two blocks of the second activation tensor may be one half of the second activation tensor. In particular embodiments, the computing system may determine that the second activation tensor needs to be transposed before the bmm operation is performed. While splitting each of the two blocks of the second activation tensor into the MSB tile and the LSB tile, the weight DMA may reorder the MSB tile and the LSB tile in a corresponding transposed order. While filling the first entry of the weight buffer of a tensor processor unit with the contents of the MSB tiles of the two blocks, the weight DMA may split each of the MSB tiles into multiples of k most-significant-four-bit units, where k is a half of a first dimension of the transposed second activation tensor. The weight DMA may fill the first entry of the weight buffer by alternately filling the k most-significant-four-bit units from each of the MSB tiles. While filling the second entry of the weight buffer of a tensor processor unit with the contents of the LSB tiles of the two blocks, the weight DMA may split each of the LSB tiles into multiples of k least-significant-four-bit units, where k is a half of a first dimension of the transposed second activation tensor. The weight DMA may fill the second entry of the weight buffer by alternately filling the k least-significant-four-bit units from each of the LSB tiles.

The embodiments disclosed herein are only examples, and the scope of this disclosure is not limited to them. Particular embodiments may include all, some, or none of the components, elements, functions, operations, or steps of the embodiments disclosed above. Embodiments according to the invention are in particular disclosed in the attached claims directed to a method, a storage medium, a system and a computer program product, wherein any element mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the elements thereof are disclosed and can be claimed regardless of the dependencies chosen in the attached claims. The subject-matter which can be claimed comprises not only the combinations of elements as set out in the attached claims but also any other combination of elements in the claims, wherein each element mentioned in the claims can be combined with any other element or combination of other elements in the claims. Furthermore, any of the embodiments and elements thereof described or depicted herein can be claimed in a separate claim and/or in any combination with any embodiment or element described or depicted herein or with any of the elements of the attached claims.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

BRIEF DESCRIPTION OF THE DRAWINGS

FIG. 15A illustrates a second activation tensor in two blocks.

FIG. 15B illustrates a transposed second activation tensor in two blocks.

DESCRIPTION OF EXAMPLE EMBODIMENTS

Before discussing the present embodiments in detail, it may be beneficial to first provide some background information regarding neural networks and machine learning (ML) models in general. A neural network, or neural net, is a nodal network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data.

Figure 1:
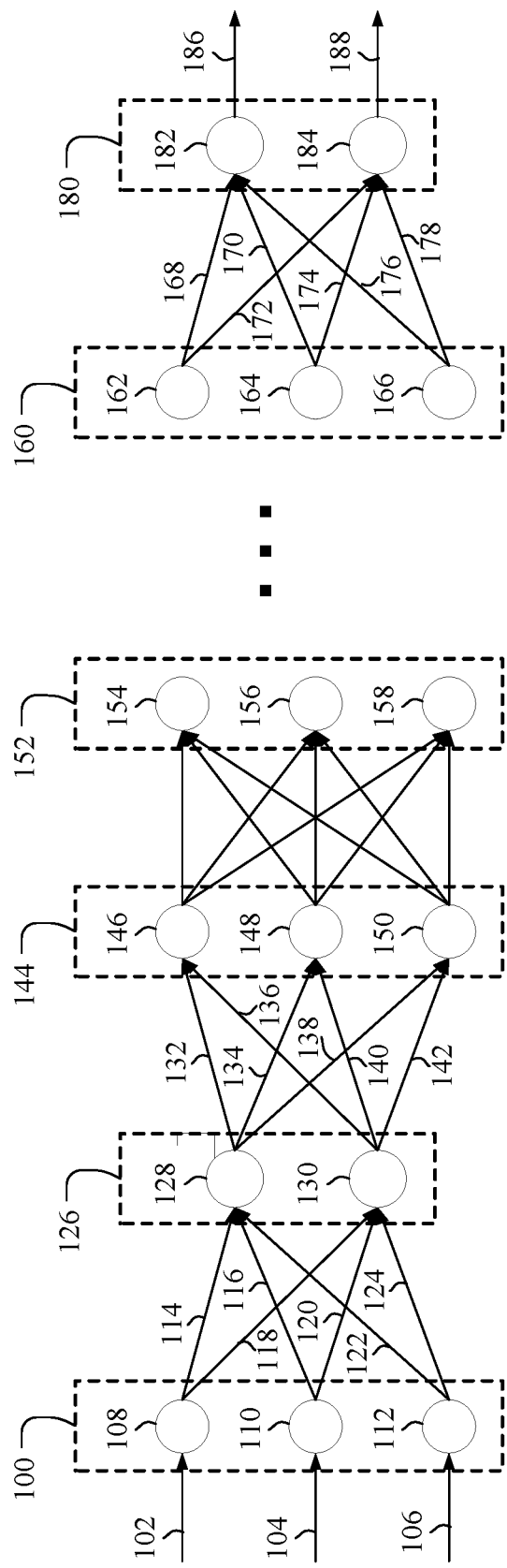
FIG. 1 illustrates selected elements of an example of a multilayer perception (MLP) neural network.

FIG. 1 illustrates selected elements of an example of a multilayer perception neural network, in accordance with particular embodiments. Its structure may include multiple hidden, e.g., internal, layers that map an input layer 100 that receives a set of inputs or a vector input to an output layer 180 that includes a set of outputs or a vector output. Each layer may include any given number of nodes, which are herein illustratively shown as circles within each layer. For example, input layer 100 includes three nodes, shown as nodes 108 110, and 112, and output layer 180 includes two nodes, shown as 182 and 184. The example neural network illustrated in FIG. 1 includes at least four hidden layers but may include additional hidden layers not shown in FIG. 1. In the illustrated example, the first hidden layer 126 includes two nodes, shown as nodes 128 and 130, while hidden layers 144, 152, and 160 each include three nodes, shown as nodes 146, 148, and 150, nodes 154, 156, and 158, and nodes 162, 164, and 166, respectively. Generally, the deeper the MLP (e.g., the greater the number of hidden layers in the MLP), the greater its capacity to learn. The input layer 100 receives a vector input, illustratively shown as a three-dimensional vector consisting of inputs 102, 104 and 106, and may apply the received vector input to the first hidden layer 126 in the sequence of hidden layers. The output layer 180 receives the output from the last hidden layer in the multilayer model, e.g., 160, processes its inputs, and produces a vector output result, illustratively shown as a two-dimensional vector consisting of outputs 186 and 188.

Typically, each neuron (or node) produces a single output that is fed forward to neurons in the layer immediately following it. However, each neuron in a hidden layer may receive multiple inputs, either from the input layer or from the outputs of neurons in a preceding hidden layer, such as the immediately preceding hidden layer or an earlier hidden layer. In general, each node may apply a function to its inputs to produce an output for that node. Nodes in hidden layers, including layers referred to as learning layers, may apply the same function or a different function to their respective input(s) to produce their respective output(s). Some nodes, however, such as the nodes in the input layer 100 may receive only one input and may be passive, meaning that each node may simply relay the value of its single input to its output(s) thus providing a copy of the input to the output(s).

In the example neural network illustrated in FIG. 1, the outputs of nodes 108, 110, and 112 of input layer 100 feed forward as inputs to hidden layer 126, which includes nodes 128 and 130. The outputs of nodes 128 and 130, in turn, feed forward as inputs to hidden layer 144, which includes nodes 146, 148, and 150, the outputs of nodes 146, 148, and 150 feed forward as inputs to hidden layer 152, which includes nodes 154, 156, and 158, and so on. Finally, the outputs of nodes 162, 164, and 166 of the final hidden layer 160 feed forward as inputs to output layer 180, which includes nodes 182 and 184. Interconnections, or links, between neurons, shown in FIG. 1 as arrows between various nodes, may have respective weights associated with them. For example, the interconnection between node 108 of input layer 100 and node 128 of hidden layer 126 may be associated with a weight 114. In addition, the interconnection between node 108 of input layer 100 and node 130 of hidden layer 126 may be associated with a weight 118, the interconnection between node 110 of input layer 100 and node 128 of hidden layer 126 may be associated with a weight 116, the interconnection between node 110 of input layer 100 and node 130 of hidden layer 126 may be associated with a weight 120, the interconnection between node 112 of input layer 100 and node 128 of hidden layer 126 may be associated with a weight 122, and the interconnection between node 112 of input layer 100 and node 130 of hidden layer 126 may be associated with a weight 124. Similarly, the interconnections between the nodes of hidden layers 126 and 144 may be associated with weights 132, 134, 138, 136, 140, and 142, respectively, and the interconnections between the nodes of hidden layers 160 and output layer 180 may be associated with weights 168, 170, 172, 174, 176, and 178, respectively. Weights associated with the remaining interconnections between nodes in the illustrated neural network are not shown in FIG. 1 for simplicity.

Typically, except for the input layer, a node (neuron) may receive as input the outputs of nodes in its immediately preceding layer. Each node may calculate its output by, e.g., multiplying each of its inputs by each input's corresponding interconnection weight, summing the products of it inputs, adding (or multiplying by) a constant defined by another weight or bias that may be associated with that particular node, and applying a function, such as a non-linear or logarithmic function, to the result. The non-linear function may be referred to as an activation function or transfer function. Multiple activation functions are known in the art, and selection of a specific activation function is not critical to the present discussion. It is noted, however, that operation of the ML model, or behavior of the neural net, is dependent upon weight values, which may be learned so that the neural network provides a desired output for a given input.

Figure 2:
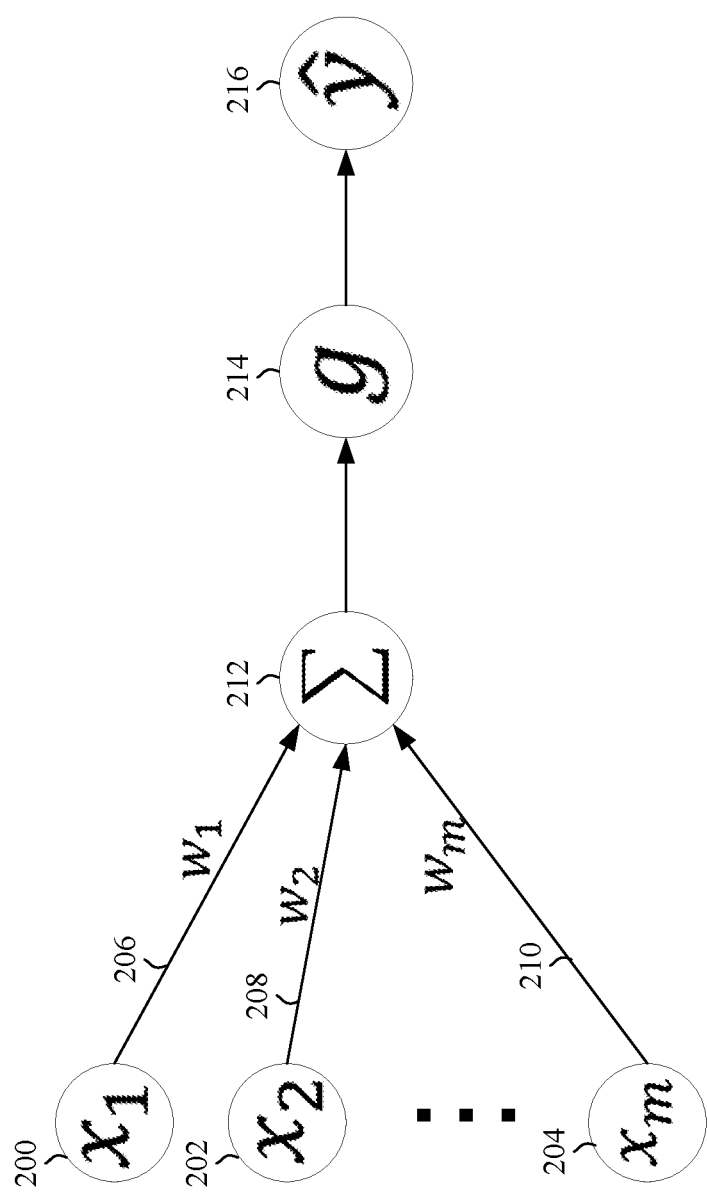
FIG. 2 illustrates selected elements of a simplified building block of a Deep Neural Network (DNN).

FIG. 2 illustrates, in a simplified view, selected elements of a building block of a Deep Neural Network (DNN). The illustrated building block generates an output vector ŷ for a particular neural network node given inputs $x_1$ (200), $x_2$ (202), and $x_m$ (204), respective interconnection weights $w_1$ (206), $w_2$ (208), and $w_m$ (210), and a non-linear activation function g (214). In the illustrated example, the output vector y may be determined by applying the activation function g (214) to a linear combination of the inputs multiplied by their corresponding weights, as follows:

$$\hat{y} = g\left(\sum_{i=1}^{m} x_i w_i\right)$$

During a training, or learning, stage, the neural network may learn, e.g., may be trained to determine, appropriate weight values to achieve a desired output for a given input. Before the neural network is trained, the weights may be individually assigned an initial value, such as a random, and optionally non-zero, value. Various methods of assigning initial weights are known in the art. The weights are then trained, or optimized, so that for a given training vector input, the neural network produces an output close to a desired, e.g., a predetermined, training vector output. The desired output against which the current output is compared may be referred to as a label for the input data. A training vector input and its corresponding training vector output may be termed an input-output training pair, and a training data set may include multiple input-output training pairs, e.g., tens to millions, or more. In this manner, the weights may be incrementally adjusted in thousands of iterative cycles, such as by a technique termed back-propagation. Several back-propagation techniques are known in the art, including several based on gradient descent, such as batch gradient descent, stochastic gradient descent (SGD), which may include mini-batch gradient descent, distributed synchronous and asynchronous SGD, elastic averaging stochastic gradient descent (EASGD), Hogwild, etc. The different back-propagation techniques may differ in how specific aspects of gradient descent are implemented, but in general, irrespective of the back-propagation technique used, in each cycle of back-propagation, a training input (e.g., vector input) is fed forward through the neural network to determine its actual output (e.g., vector output). An error for each output neuron, or output node, is then calculated based on the actual neuron output and a target or desired training output for that neuron. The process then propagates back through the neural network (in a direction from the output layer back to the input layer), updating the weights based on how much effect each weight has on the overall error so that the output of the neural network moves closer to the desired training output. This cycle may then be repeated until the actual output of the neural network is within an acceptable error range of the desired training output. In machine learning, an epoch typically refers to one complete pass, including back-propagation, if applicable, of the full training dataset to be learned through the machine-learning model. In one epoch, the full training dataset may be submitted to the learning algorithm in a single training iteration, in which case a "batch" of training data is used, or the full training dataset may be submitted in the aggregate after multiple training iterations, each using a subset of the training dataset referred to as a "mini-batch".

Construction of a neural network model, or a machine-learning model in general, may include a learning stage, which may also be referred to as a training stage, and an inference stage, which may also be referred to as an operational, execution, or service stage. In the learning stage, the neural network may be trained for a specific purpose and may be provided with a set of training examples, including training inputs and training outputs provided as input-output training pairs, and optionally including a set of validation examples to test the progress of the training. During this learning process, various weights associated with nodes and node-interconnections (e.g., links) in the neural network may be incrementally adjusted in order to reduce the error between an actual output of the neural network and the desired training output. In this manner, a multi-layer feed-forward neural network, such as that discussed above, may be made capable of approximating any measurable function to any desired degree of accuracy. The result of the learning stage is a machine learning model that has been trained. In the inference stage, an input with unknown outputs may be submitted to the trained machine learning model, e.g., to server or edge device executing the trained ML model, which may apply what has been learned to process the input to produce an output prediction.

For ease of illustration, some aspects of a neural network framework may be disclosed herein within the context of practical example implementations. Due to real-world hardware limitations, neural networks may have practical size limits. For example, some ML models may achieve large sizes of 10 GB, or more, which may require a long time to train and complicate their hardware implementation. Therefore, in particular embodiments, an ML model may be distributed among multiple similar machines, e.g., machines having identical or substantially similar architectures, using various distributive techniques. Furthermore, it is typically desirable that the hardware, e.g., a computing system, used to train an ML model be tailored to the ML model itself and that all training be done on the same computing system. At times, a computing system used to train an ML model may include fast computing devices optimized for computational capacity and remote memory banks, e.g., parameter servers, that may hold interim parameter values, e.g., weight values.

As used herein, the terms "feature" or "features" may refer to input data or output data associated with a convolution operation. In particular embodiments, the output of each layer of a convolutional neural network may be represented by features that no longer resemble the original input in content, size, and/or shape. For example, an input image including 10×10 pixels with RGB channels may be represented by 10×10×3 features. After one round of convolution, the output may be represented by 4×4×2 features that might or might not look like an image. After a second round of convolution in which the 4×4×2 features are processed, the output may be represented by a 1×1 feature that looks nothing like an image, in this example. Features organized in a 3D manner may be referred to herein as a "tensor" having dimensions of height (x), width (y), and a number of channels (z). Note that image data is a very specific type of input that is commonly processed using machine learning and neural networks, but it is by no means the only type of data that can be processed using these techniques and using the ML accelerators described herein. For example, the input data processed by a convolutional neural network may represent a depth map, parameterized user information, a heat map for weather forecasting, etc.

Computing systems and system configurations may be tailored not only for particular types of machine learning models and training algorithms, but also for the types of data the machine learning model is designed to process. For example, machine learning models may receive different types of inputs or features, such as dense inputs, which are typically long vectors, sparse inputs, or a combination of both. Dense feature vectors may be used to represent dense inputs and sparse feature vectors may be used to represent sparse inputs. A dense feature vector may be represented by a mostly-populated vector, e.g., a vector having mostly non-zero entries/cells. A common example of a dense feature vector is image data. As another example, a dense feature vector may include determinable descriptors common to or determinable for most users or circumstances, depending upon the specific application, which may be gleaned from multiple sources. For example, dense features may include personal information associated with a user, information identifying a source of the input information, or other contextual information, such as a location, a time-of-day, etc. It is noted that some dense features may be obtained by user-provided input, while others may be collected from user-related demographic or geographic information, user-device status information, user network activity, or other observable user-related sources. A dense input may be thought of as a collection of multiple, definitely determinable descriptors, where each descriptor may be given a numeric value. Because dense inputs may comprise many descriptor types, e.g., many signal/value sources, that together may characterize, describe, or represent a user or circumstance, a dense input may be a large, dense vector with one or more cells/dimensions/entries in the dense vector being designated to each descriptor type.

A sparse input may reflect more semantic information related to a particular task objective. The sparse input may be defined by a sparse feature vector that identifies selections within a larger list(s) of options, such as lists that may further be divided/grouped into different categories. This may be the case when the list of identifiers that comprises the sparse input identifies individual selections from a larger list of options, such as those provided by the dense vector. As a result, a sparse vector may be characterized by having mostly zero entries, and a few non-zero entries. Consequently, a sparse vector may be represented as a series of indexes pointing to select cell positions in the larger list having non-zero values, along with each index's corresponding non-zero value for that position, with the understanding that all other positions not identified by index have a default zero value. Sparse inputs may not necessarily be directly descriptive of a user or circumstance but may instead provide auxiliary information indirectly related to the user or circumstance. Typically, because of their many zero-entry cells, sparse vectors may not be well-suited for direct input to a neural network.

Figure 3A:
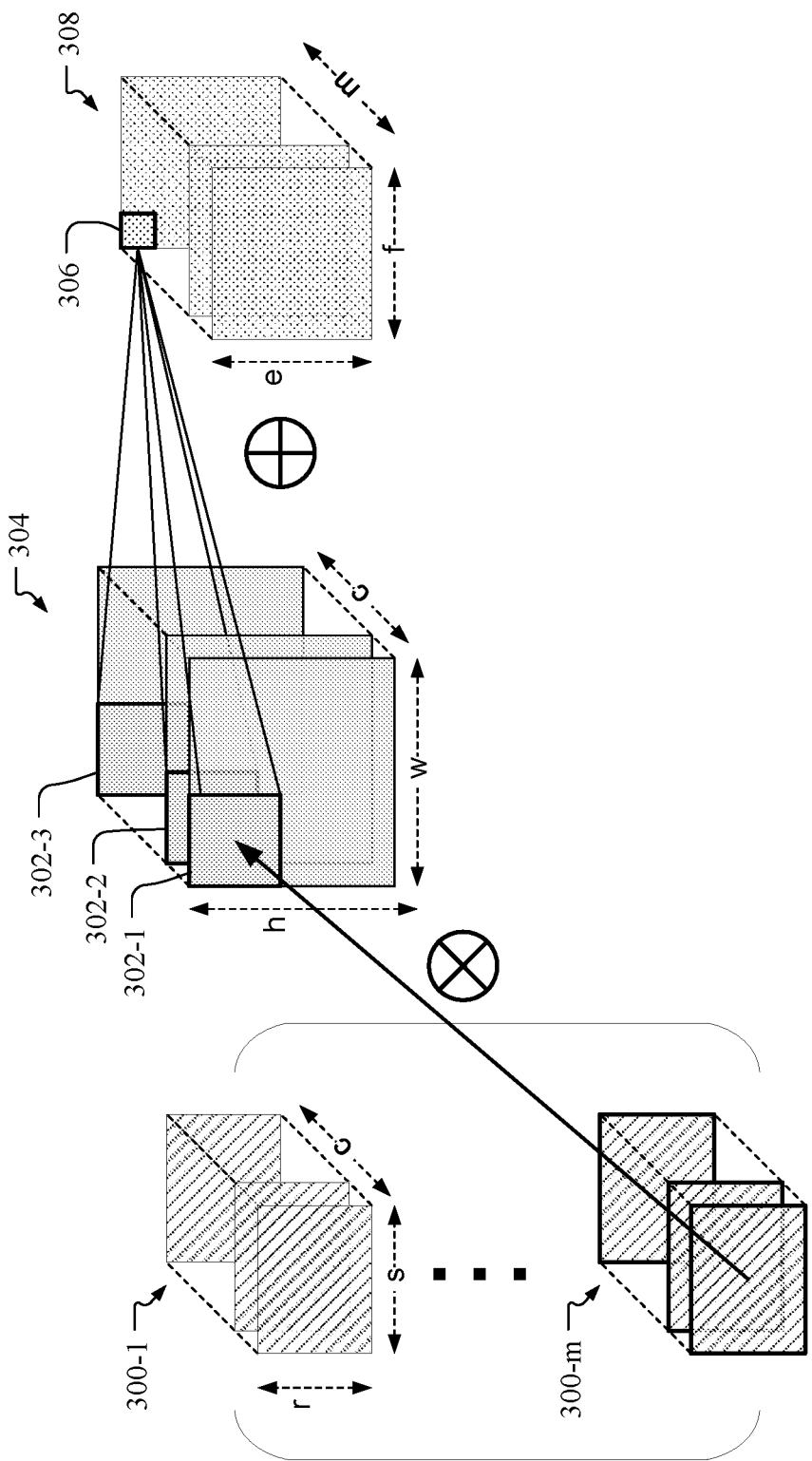
FIG. 3A illustrates selected elements of an example convolutional layer in a convolutional neural network (CNN).

FIG. 3A illustrates selected elements of an example convolutional layer in a convolutional neural network. In the illustrated example, a three-dimensional (3D) output feature map 308 is generated by performing a series of two-dimensional (2D) convolution operations over a 3D input feature map 304 using a collection of 2D convolution filters 300. More specifically, the input feature map 304 has dimensions h (height)×w (width)×c (where c represents the number of input channels) and the output feature map 308 has dimensions e×f×m (where m represents the number of output channels). In this example, multiple filters 300 are to be applied to the input feature map to generate each element, of each channel, of the output feature map. More specifically, a respective different filter 300 is applied to produce the elements of the output feature map for each given output channel. Therefore, the number of filters 300 (i.e., m) matches the number of output channels (m).

As shown in FIG. 3A, each 3D filter 300 includes a respective 2D kernel of dimensions r×s for each input channel c, and each 2D filter kernel defines a collection of weights, where a respective weight value is associated with each kernel element, as identified by its position within the r×s kernel. For example, each 2D filter kernel may be represented as a 3×3 grid of weights to be convolved with a similarly-sized collection of features within input feature map 304. More specifically, each 2D kernel of filter 300-$m$ is applied in a convolution operation over the elements in a respective channel of input feature map 304. For example, a first 2D kernel of filter 300-$m$ provides the weights that are multiplied by respective values of the elements in an r×s sized portion 302-1 of the elements of a first channel of input feature map 304, a second 2D kernel of filter 300-$m$ provides the weights that are multiplied by respective values of the elements in an r×s sized portion 302-2 of the elements of a second channel of input feature map 304, and so on, such that a final 2D kernel of filter 300-$m$ provides the weights that are multiplied by respective values of the elements in an r×s sized portion 302-3 of the elements of the last channel of input feature map 304. The results of these multiplication operations are then combined to generate a single element 306 of a single channel of output feature map 308, as shown in FIG. 3A. This process is repeated as the 2D kernels of filter 300-$m$ are applied to other portions of input feature map 304 to produce the remaining elements of output feature map 308 in the same output channel as element 306, and as the 2D kernels of respective other ones of the filters 300 are applied to input feature map 304 to produce the elements of output feature map 308 in each of the remaining output channels.

Figure 3B:
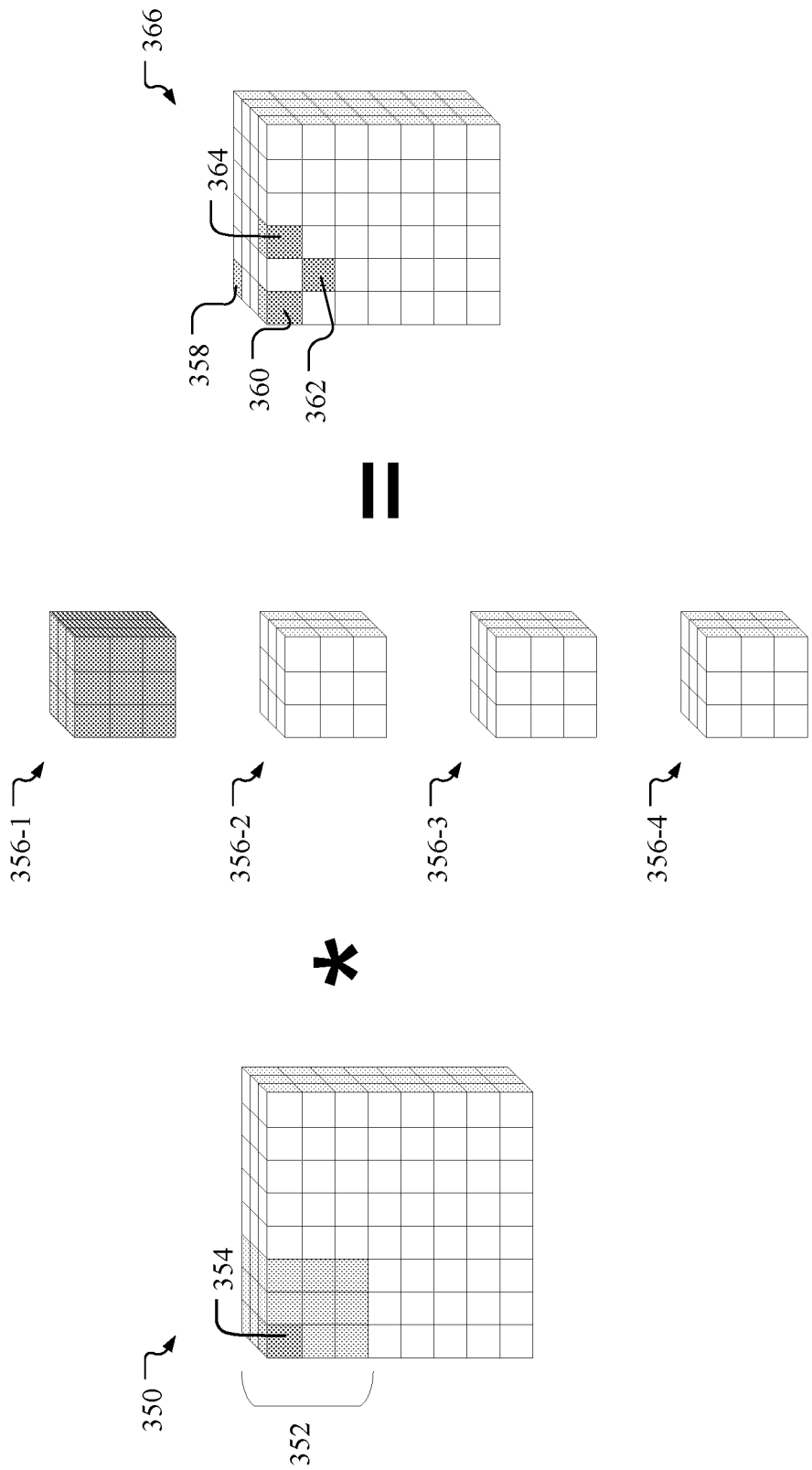
FIG. 3B illustrates an example multi-level convolution operation.

FIG. 3B illustrates an example multi-channel convolution operation, in accordance with particular embodiments. In this example, a multi-channel (3D) output feature map 366 is generated by the application of multiple 3D filters 356 to successive portions of a multi-channel (3D) input feature map 350. In this example, the dimensions of input feature map 366 are X×Y×Zin, where Zin represents the number of input channels, and the dimensions of output feature map 366 are Xout×Yout×Zout, where Zout represents the number of output channels. Each 3D filter 356 includes a respective 2D kernel of dimensions KernelX×KernelY for each output channel zout in Zout, where kx and ky represent the x/y position of a particular element of the 2D kernel corresponding to a particular output channel. In this example, the value of each element of output feature map 366 is computed as follows:

$$[x][y][zout] += \text{activations}[x + kx][y + ky][zin] * \text{weights}[kx][ky][zin][zout]$$

In the illustrated example, there is one 3D filter 356 for each channel (zout) in Zout. More specifically, the illustrated multi-channel convolution uses four 3D filters 356 to generate elements for each x/y position in each of four output channels, respectively, while sweeping the appropriate 2D kernels across and down the elements of input feature map 350 in each of the input channels. For example, the value of element 360 of output feature map 366 is determined by applying highlighted 3D filter 356-1 to the highlighted portion 352 of input feature map 350, i.e., 27 activations including 9 activations in respective x/y positions in each of 3 input channels zin. Similarly, the value of element 358 of output feature map 366 is determined by applying 3D filter 356-4 to the highlighted portion 352 of input feature map 350.

Traversing input feature map 350 in the x dimension involves sweeping the highlighted portion 352 across the input feature map such that element 354 moves one position to the right to identify a next set of activations for each successive iteration in the x dimension. For example, the value of element 364 of output feature map 366 is determined by applying 3D filter 356-1 to the highlighted portion 352 of input feature map 350 after the highlighted portion has been moved from the initial position in which it is shown in FIG. 3B to a location two positions to the right. Traversing input feature map 350 in the y dimension involves sweeping the highlighted portion 352 across the input feature map such that element 354 moves one position down to identify a next set of activations for each successive iteration in the y dimension. For example, the value of element 362 of output feature map 366 is determined by applying 3D filter 356-1 to the highlighted portion 352 of input feature map 350 after the highlighted portion has been moved from the initial position in which it is shown in FIG. 3B to a location one position down and one position to the right.

Performing the multi-channel convolution illustrated in FIG. 3B involves performing a series of 2D convolutions, as follows:

for *zout* in *Zout* for *x* in *Xout* for *y* in *Yout* for *kx* in *KernelX* for *ky* in *KernelY* for *zin* in *Zin* output[*x*][*y*][*zout*] +=
activations[*x* + *kx*][*y* + *ky*][*zin*] * weights[*kx*][*ky*][*zin*][*zout*]

In particular embodiments, the generation of scalar addresses identifying the input and output elements for each 2D convolution is performed by the compiler when generating the tensor instructions that represent the multi-channel convolution. In particular embodiments, the generation of scalar addresses for each of the corresponding input tensors (activation addresses), weight tensors (weight addresses), and output tensor (output address) may be performed in hardware, such as within the ML accelerators described herein, in accordance with the following:

for the activation addresses:

> for x in Xout
>   for y in Yout
>     for kx in KernelX
>       for ky in KernelY
>         for zin in Zin
>           activations [x + kx][y + ky][zin], for the weight addresses:

> for zout in Zout
>   for kx in KernelX
>     for ky in KernelY
>       for zin in Zin
>         weights[kx][ky][zin][zout], and for the output address:

> for zout in Zout
>   for x in Xout
>     for y in Yout
>       for zin in Zin
>         outputs[x][y][zout].

Figure 4A:
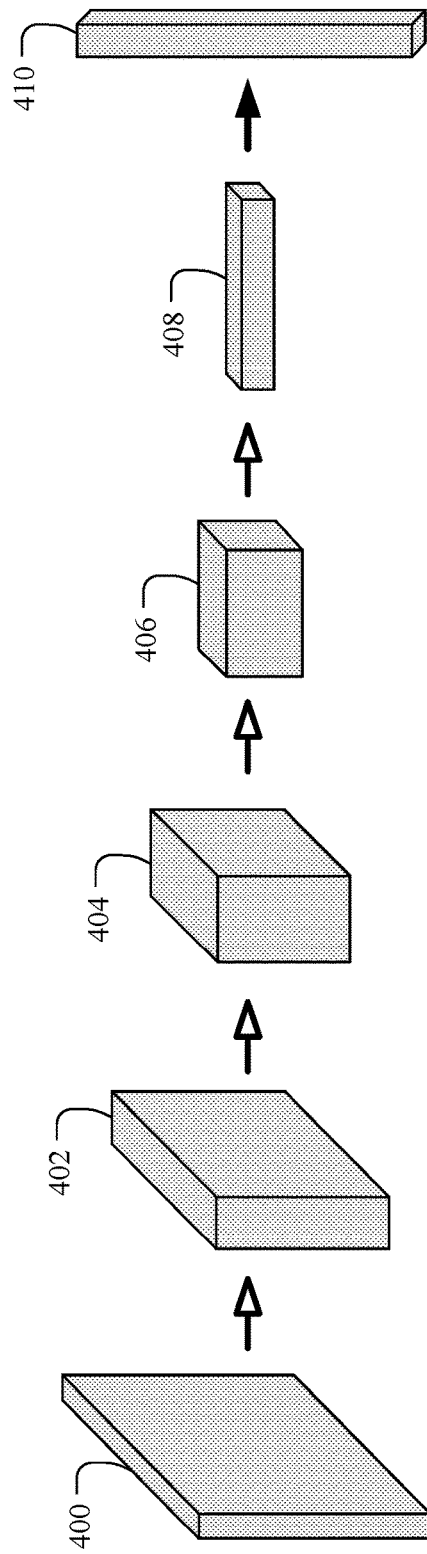
FIG. 4A illustrates an example CNN for a classification-type network.

FIG. 4A illustrates an example convolutional neural network in which an output feature map 410 is generated based on an input feature map 400 in a classification-type neural network. This type of neural network may typically involve a small or medium resolution input, a single vector output, and a relatively large number of output channels. In the illustrated example, intermediate feature maps of different sizes and shapes, shown as feature maps 402, 404, 406 and 408, are generated by performing successive convolution operations on each such intermediate feature map, in turn, and the output feature map 410 is generated by a fully connected (FC) layer operating on the final intermediate feature map 408. As shown in FIG. 4A, it may be typical for the overall size, and corresponding memory requirements, to be reduced for each successive intermediate feature map in a classification-type neural network.

Figure 4B:
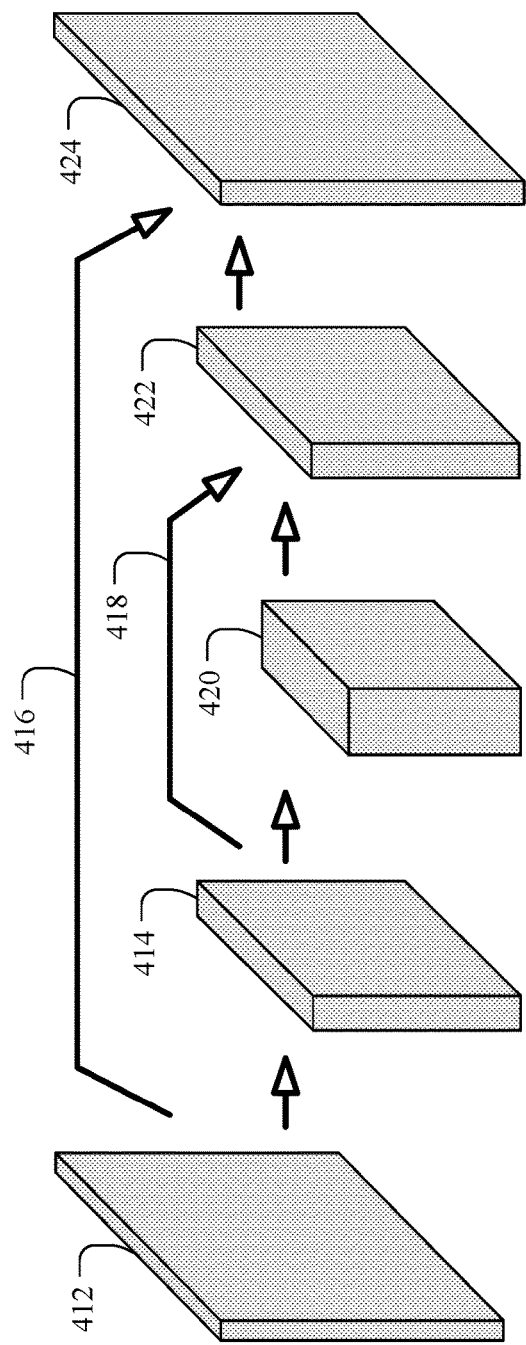
FIG. 4B illustrates an example CNN for a UNet-type network.

FIG. 4B illustrates an example CNN in which an output feature map 424 is generated based on an input feature map 412 in a UNet-type neural network. This type of neural network may involve high resolution input and/or output feature maps and a relatively small number of input and/or output channels. This type of neural network may also involve long skip connections such that a particular intermediate feature map may be dependent not only on the immediately preceding intermediate feature map but also on another previous intermediate feature map. Such skip connections are shown by arrows 416 and 418 in FIG. 4B. In the illustrated example, intermediate feature maps of different sizes and shapes, shown as feature maps 414, 420, and 422, are generated using a series of convolution operations prior to the generation of the output feature map 424. In this example, intermediate feature map 414 is generated based on input feature map 412, intermediate feature map 420 is generated based on intermediate feature map 414, intermediate feature map 422 is generated based on both intermediate feature map 420 and on intermediate feature map 414, and output feature map 424 is generated based on both intermediate feature map 422 and input feature map 412. In particular embodiments, such as in AR/VR applications, the input and output feature maps may have similar sizes and shapes, while the sizes and shapes of the intermediate feature maps may vary widely. For example, in some cases, a particular intermediate feature map may be shorter, narrower, and/or shallower than the preceding feature map(s) from which it was generated, while in other cases, a particular feature map may be taller, wider, and/or deeper than the preceding feature map(s) from which it was generated.

As noted above, in a convolutional neural network, the convolutional layers typically account for the vast majority of the computations performed and the data movement within the CNN and/or between the CNN and other elements of an ML model, making them a performance bottleneck. Therefore, modern CNN accelerators focus on using high compute parallelism along with an optimized data orchestration throughout the memory hierarchy to speed up the processing of convolutional layers. Conventionally, individual tensor processor units within a machine learning accelerator may asynchronously perform convolution operations (e.g., multiplication, accumulation, pooling, and the like) on image data or another type of input feature map, or a portion thereof that has been spatially partitioned. However, effectively harnessing the compute power of these accelerators may require the design of a particular mapping scheme that dictates when (i.e., at which processing cycle) and where (i.e., at which compute data path among hundreds to thousands of them) each operation (i.e., each multiply-and-accumulate, or MAC) is performed. The design of such a mapping scheme may, in turn, have an impact on the hardware architecture design, as the hardware would need to be able to deliver data at the right time and in the right format to the right compute data path so that it can be operated on in the right cycle.

Figure 5A:
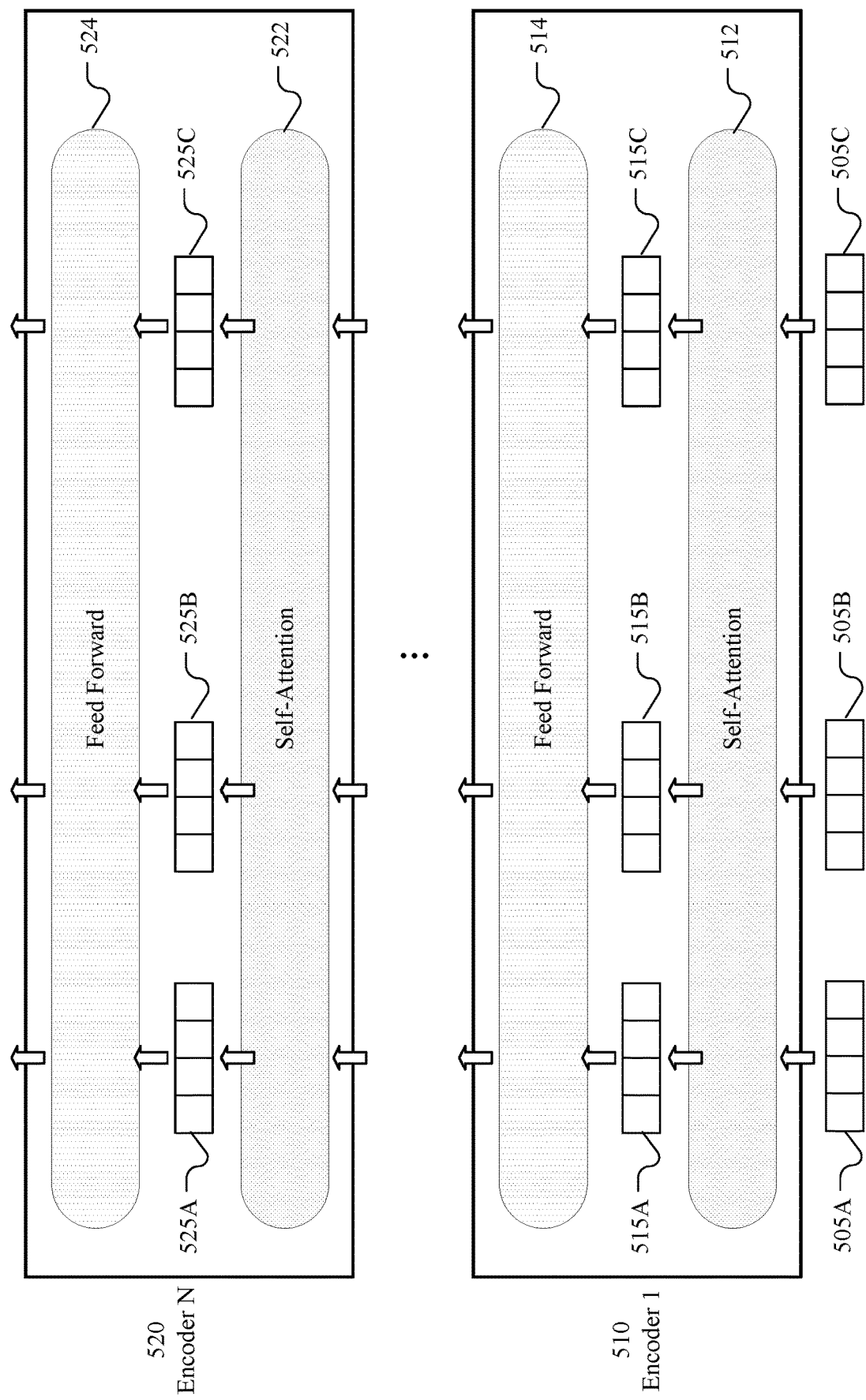
FIG. 5A illustrates an example encoding component of a Transformer architecture.

Another machine-learning architecture called Transformer architecture has been gaining popularity. The Transformer architecture has been widely used for language models, vision models, and any other suitable models. A typical Transformer architecture may comprise an encoding component and a decoding component. FIG. 5A illustrates an example encoding component of a Transformer architecture. The encoding component may comprise a plurality of encoders 510, 520. FIG. 5A illustrates only two encoders for simplicity, but a typical encoding component may comprise more encoders. The encoders may be identical in structure though the encoders may not share weights with each other. The first encoder 510 may be broken into two sub-layers: a self-attention layer 512 and a feed forward layer 514. Likewise, the $N^{th}$ encoder 520 may comprise two sub-layers: a self-attention layer 522 and a feed forward layer 524. In the example illustrated in FIG. 5A, input embeddings 505A, 505B, and 505C may be processed by the self-attention layer 512 of the first encoder 510. All the encoders within the encoding component may take a list of embeddings of an identical size as input. The first encoder 510 of the encoding component may take the input embeddings 505A, 505B, and 505C as input while the other encoders of the encoding component may take output of a preceding encoder. The self-attention layer 512 of the first encoder 510 may produce output embeddings 515A, 515B, and 515C, which would be processed by the feed forward layer 514 of the first encoder 510. The output of the feed forward layer 514 may be provided to the self-attention layer of a second encoder (not shown in FIG. 5A) as input. As the encoding component illustrated in FIG. 5A comprises N encoders, the $N^{th}$ encoder 520 may be the last encoder of the encoding component. The $N^{th}$ encoder 520 may take output embeddings of an $N-1^{st}$ encoder as input. The self-attention layer 522 of the 520 may produce embeddings 525A, 525B, and 525C by processing the output embeddings of the $N-1^{st}$ encoder (not shown in FIG. 5A). The embeddings 525A, 525B, and 525C may be processed through the feed forward layer 524 of the $N^{th}$ encoder 520. Output embeddings of the feed forward layer 524 may be provided to the decoding component of the Transformer architecture.

Figure 5B:
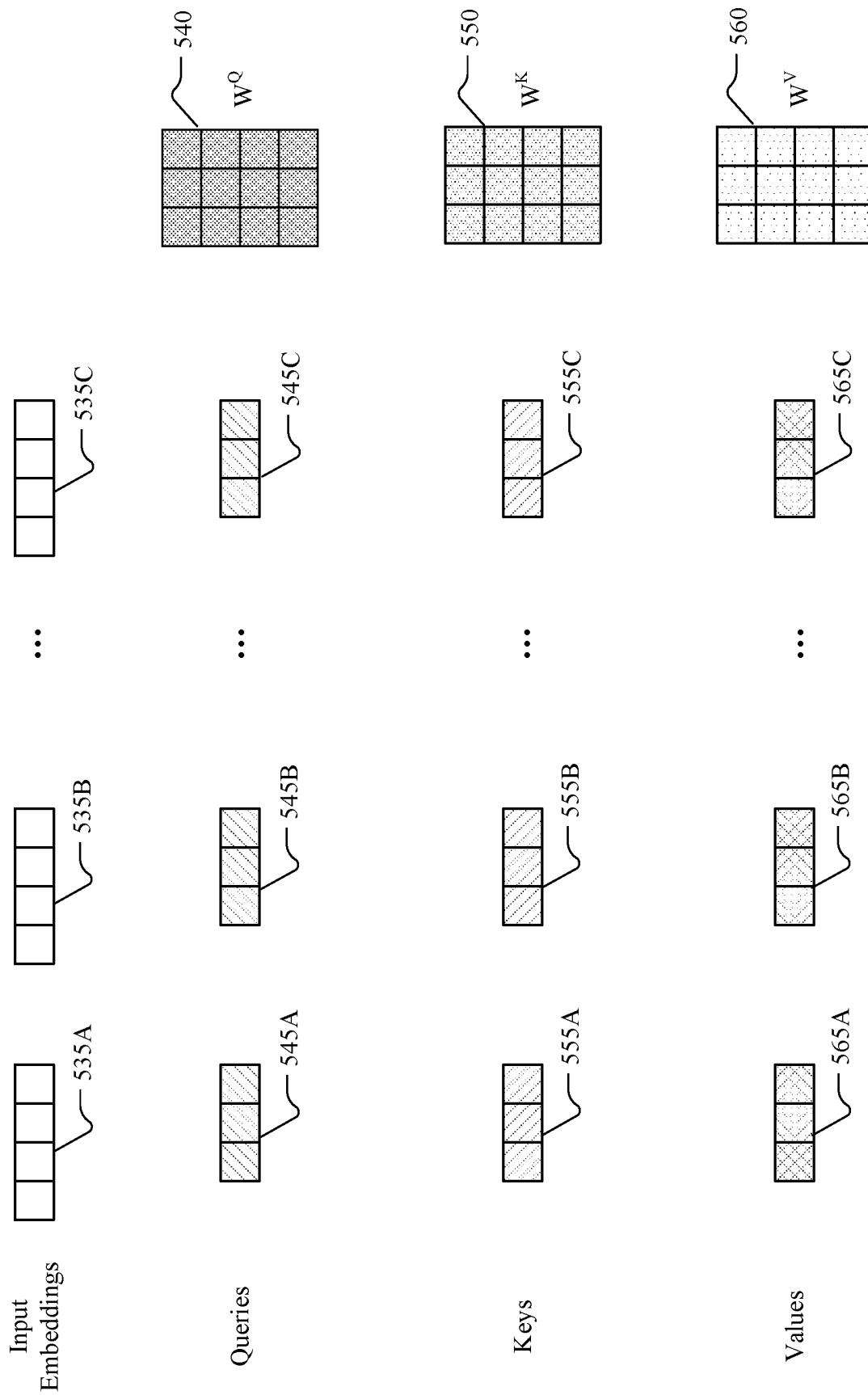
FIG. 5B illustrates an example processing for calculating embeddings from input embeddings at a self-attention layer.

FIG. 5B illustrates an example processing for calculating embeddings from input embeddings at a self-attention layer. Each self-attention layer may maintain three matrices: $W^Q$ 540, $W^K$ 550, and $W^V$ 560. A query embedding 545A corresponding to an input embedding 535A may be calculated by multiplying the input embedding 535A with $W^Q$ 540. A key embedding 555A corresponding to the input embedding 535A may be calculated by multiplying the input embedding 535A with $W^K$ 550. A value embedding 565A corresponding to the input embedding 535A may be calculated by multiplying the input embedding 535A with $W^V$ 560. Likewise, a query embedding 545B, a key embedding 555B, and a value embedding 565B corresponding to an input embedding 535B may be calculated by multiplying the input embedding 535B with $W^Q$ 540, $W^K$ 550, and $W^V$ 560, respectively. Also, a query embedding 545C, a key embedding 555C, and a value embedding 565C corresponding to an input embedding 535C may be calculated by multiplying the input embedding 535C with $W^Q$ 540, $W^K$ 550, and $W^V$ 560, respectively.

After calculating query embeddings 545A, 545B, and 545C, key embeddings 555A, 555B, and 555C, and value embeddings 565A, 565B, and 565C corresponding to input embeddings 535A, 535B, and 535C, the self-attention layer may calculate self-attention scores for all the possible pairs of input embeddings. A self-attention score $S_{i,j}$ between input embeddings i and j may be calculated as a dot product of query embedding $Q_i$ corresponding to the input embedding i and key embedding $K_j$ corresponding to the input embedding j. A self-attention score $S_{i,j}$ may be converted into a softmax score $SM_{i,j}$ as $s_{i,j}/\Sigma_k s_{i,k}$. An output embedding $O_i$ corresponding to input embedding i may be calculated as: $O_i = \Sigma_k SM_{i,k} \cdot V_k$. A value of the output embedding $O_i$ may depend on the value of the query embedding $Q_i$, values of key embeddings $K_k$, and values of value embeddings $V_k$ for all k in $\{1, \ldots, K\}$, where K is a number of input embeddings.

A mechanism called multi-headed self-attention may improve the performance of the self-attention layer. The multi-headed self-attention may give the self-attention layer multiple representation subspaces by introducing multiple sets of weight matrices: $W_m^Q$, $W_m^k$, and $W_m^V$ for all m in $\{1, \ldots, M\}$, where M is a number of heads. For each input embedding, M different sets of query, key, and value embeddings may be calculated by multiplying the input embedding with each of M sets of weight matrices. A sub output embedding may be calculated using each set of query, key, and value embeddings. An output embedding of the multi-headed self-attention layer corresponding to an input embedding may be produced by concatenating the sub output embeddings corresponding to the input embedding and then multiplying with a weight matrix that is trained jointly with the multi-headed self-attention network.

Figure 5C:
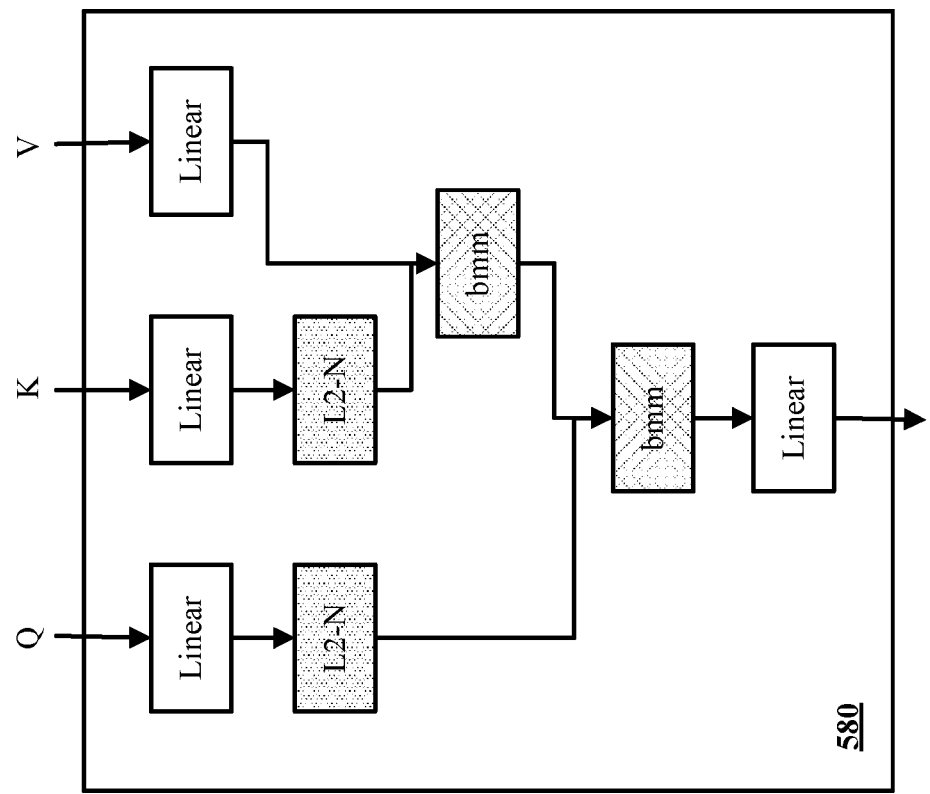
FIG. 5C illustrates two example flows for multi-headed self-attention computation.
Figure 5C:
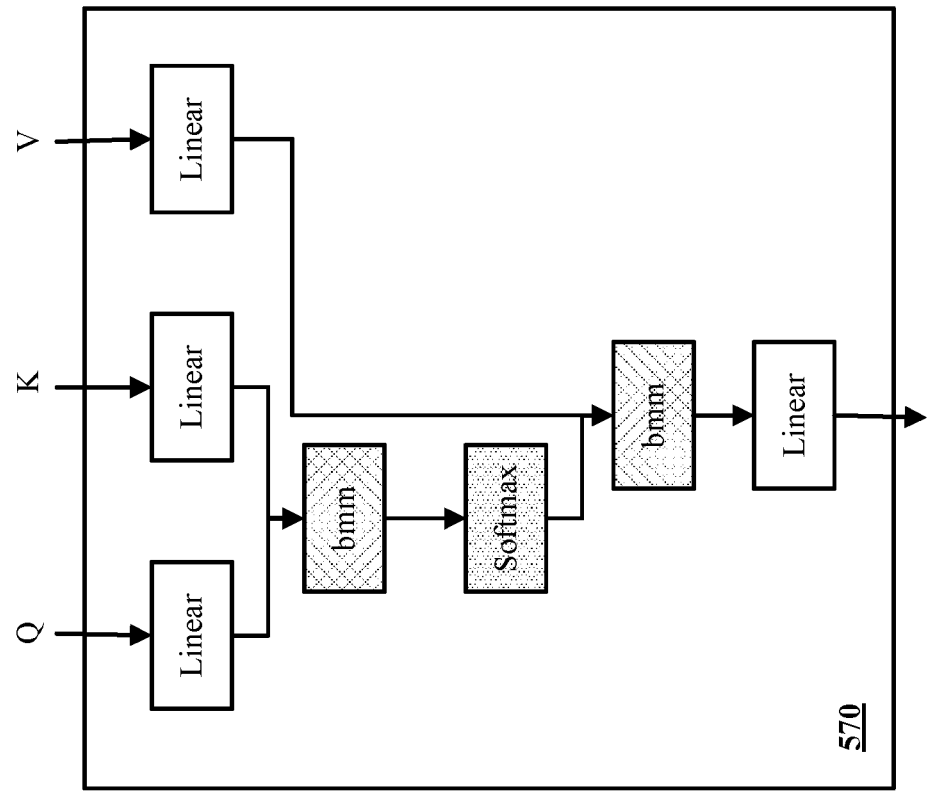

FIG. 5C illustrates two example flows for multi-headed self-attention computation. A first flow 570 represents a traditional multi-headed self-attention, while a second flow 580 shows an efficient variant called Fast Attention. Fast Attention implements the attention between query, key, and value embeddings in different orders. A first difference between a self-attention network and a CNN network may be that the self-attention network (for both traditional multi-headed self-attention and Fast Attention) comprises batch matrix-matrix product (bmm) operators that perform General Matrix Multiplication (GEMM) between two runtime-generated activation tensors, instead of between an activation tensor with off-line generated weight tensor. Another difference between the self-attention network and the CNN network may be that various normalization operators including softmax operators and layer normalization (L2-N) operators with runtime-generated scaling factors instead of batch normalizations with offline-generated scaling factors.

The ML accelerators described herein employ a multi-level control architecture designed to optimally exploit parallelism provided by tensor processor units in the ML accelerator. These machine learning accelerators may include one or more tensor processor clusters, each of which may include multiple tensor processor units. Each tensor processor unit may be a single-instruction-multiple-data (SIMD) machine that includes a compute array capable of performing vector operations to implement data parallelism or model parallelism at the tensor processor unit or tensor processor cluster level. Each tensor processor cluster may include a shared controller that controls and synchronizes the operations of the tensor processor units within the cluster so that they perform a common series of operations in parallel and in lockstep. As described in more detail herein, the multi-level control architecture may support more flexibility in parallelism for computations of neural network layers than is possible using existing ML acceleration schemes, while lowering hardware costs due to the physical circuit area and/or power consumed by various tensor instructions. The multi-level apparatus may be used to implement any of a variety of neural network solutions to machine learning problems including, but not limited to, object identification, feature classification, or content-driven image processing. The multi-level apparatus may be particularly well suited for implementation within edge devices that have strict power consumption constraints and that run inference exercises using previously trained models in real time, such as in AR/VR headsets.

Figure 6:
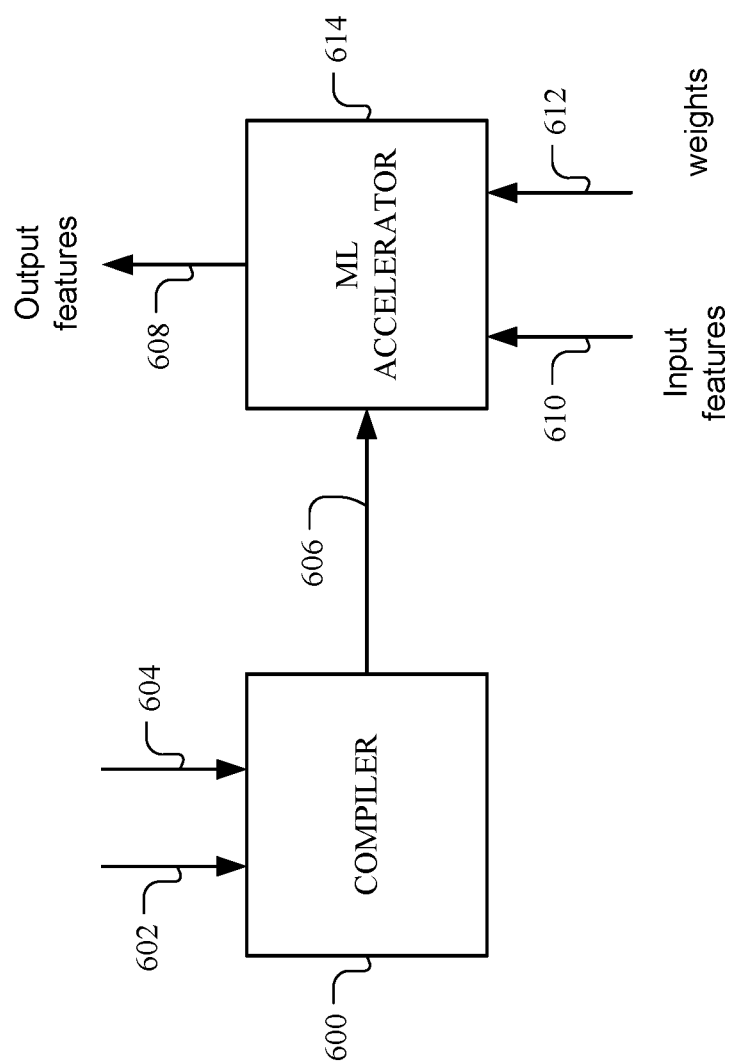
FIG. 6 illustrates selected elements of an example system including a compiler and an ML accelerator.

FIG. 6 illustrates selected elements of an example system including a compiler 600 and an ML accelerator 614. In the illustrated example, compiler 600 generates machine language instructions, shown as tensor instructions 606, based on inputs including programming language instructions 602 and configuration information 604 indicating the configuration of a neural network that is to perform the tensor instructions 606. In this example system, ML accelerator 614 receives the tensor instructions 606 and generates, for input features 610 and applicable weights 612, output features 608. For example, compiler 600 may, in accordance with an instruction set architecture (ISA) that is used to facilitate machine learning processing for a specific hardware architecture, map a single ML operation (such as a convolution operation) to multiple machine language instructions, any or all of which may be multi-dimensional (tensor) instructions. In particular embodiments, a full ML layer may be represented using one or more instructions in each of three classes of hardware instructions: compute instructions, non-linear unit (NLU) instructions, and direct-memory access (DMA) instructions.

In particular embodiments, the compiler 600 may analyze a workload to be performed by the neural network and determine respective coarse-grained tensor instructions to be sent to each tensor processor cluster of ML accelerator 614 using a SIMD and/or single-program-multiple-data (SPMD) approach to distribute the workload. The compiler 600 may distribute the workload based on the architecture of the neural network, the number of tensor processor clusters, the number and processing capacity of the tensor processor units in each tensor processor cluster, the input and output feature dimensions, the number and types of convolutions and other operations to be performed at different layers of the neural network, and/or the relationships between the output features produced at each layer and the input features required at the next layer. The workload distribution decisions may maximize the reuse of locally available feature sets and weights once they are loaded into the memories of particular tensor processor units, reduce the amount of data movement required between and within tensor processor clusters, and optimize resource utilization in ML accelerator 614.

In particular embodiments, the ML accelerator 614 may comprise a direct memory access (DMA) that is programmed with DMA instructions for iteratively transferring a plurality of non-contiguous blocks of data from a source memory to a destination memory through n-dimensional loops without being re-programmed. The DMA instructions may be programmed based on tensor instructions generated by a compiler 600. The DMA may be referred to as a smart DMA. The smart DMA may be used for instruction fetch and data transfer between the ML accelerator and external memories, as well within the ML accelerator 614. In particular embodiments, the smart DMAs may be used for fetching instructions to instruction master, fetching activation, weight, non-linear unit (NLU) parameters and look-up table (LUT) values to tensor processor clusters, Intra-cluster and inter-cluster activation halo transfers, FILL values to cluster activation memory, and transferring activations out to an external memory. As an example and not by way of limitation, the compiler 600 may generate coarse-grained tensor instructions for convolution operations. The coarse-grained tensor instructions may comprise parameters associated with an input tensor, parameters associated with an output tensor, and parameters associated with weight tensors. The DMA instructions for iteratively retrieving portions of the input tensor from an external memory to activation memory of tensor processor units may be generated based on the coarse-grained tensor instructions. The DMA instructions for iteratively retrieving weight tensors from the external memory to weight buffers of the tensor processor units may also be generated based on the coarse-grained tensor instructions. Although this disclosure describes a particular DMA that is programmed with DMA instructions for iteratively transferring a plurality of non-contiguous blocks of data from a source memory to a destination memory through n-dimensional loops without being re-programmed, this disclosure contemplates any suitable DMA that is programmed with DMA instructions for iteratively transferring a plurality of non-contiguous blocks of data from a source memory to a destination memory through n-dimensional loops without being re-programmed.

Figure 7A:
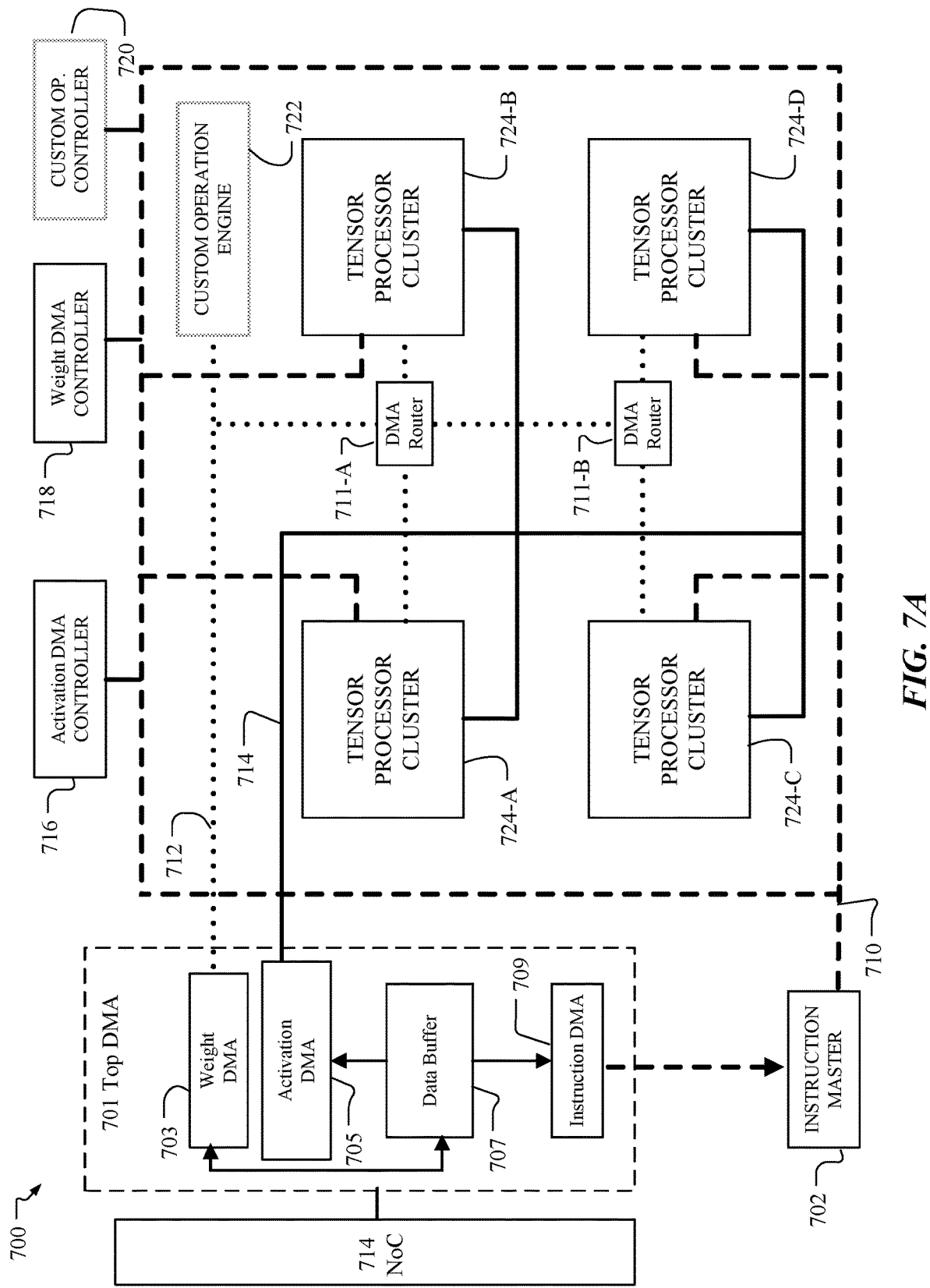
FIG. 7A illustrates selected elements of an example ML accelerator including multiple tensor processor clusters.

FIGS. 7A through 7E illustrate selected elements of an example ML accelerator, such as an ML accelerator similar to ML accelerator 614 illustrated in FIG. 6, at different levels of the multi-level accelerator architecture. For example, FIG. 7A illustrates that an example ML accelerator 700 may include four tensor processor clusters 724 and may include, or be communicably coupled to, one or more activation DMA controllers 716, a weight DMA controller 718, and/or an optional custom operation engine 722 and a corresponding optional custom operation controller 720. The ML accelerator 700 may include, or be communicably coupled to a top DMA 701, which may comprise a weight DMA agent 703, one or more activation DMA agents 705, a data buffer 707, and an instruction DMA agent 709. The top DMA 701 may be communicably coupled to one or more external memory over network on a chip (NoC) 714. The ML accelerator 700 may include, or be communicably coupled to, an instruction master 702, which may be communicably coupled to each of the four tensor processor clusters 724, the activation DMA controllers 716, the weight DMA controller 718, instruction DMA agent 709 over an instruction bus 710. The weight DMA 703, the activation DMA 705 and the instruction DMA 709 may additionally be communicably coupled to the data buffer 707. The weight DMA 703 may be communicably coupled to each of the four tensor processor clusters 724 (via DMA routers 711) and the optional custom operation engine 722 over weight DMA bus 712. The activation DMA 705 may be communicably coupled to each of the four tensor processor clusters 724 over activation DMA bus 714. In at least some embodiments, ML accelerator 700 may also include a synchronization bus (not shown in FIG. 7A) communicably coupled to the four tensor processor clusters 724, the activation DMA controller 716, the weight DMA controller 718, the optional custom operation engine 722 and corresponding optional custom operation controller 720, the instruction master 702, the weight DMA 703, the activation DMA 705, the instruction DMA 709, and/or the data buffer 707, or any suitable subset thereof.

To support multiple tensor processor clusters processing input features in parallel, weight DMA controller 718 may distribute neural network weights (e.g., in packets) to tensor processor clusters 724 via weight DMA bus 712. The network topology in which the weight DMA controller 718 is communicatively coupled to each of the tensor processor clusters 724 may allow each tensor processor within a tensor processor cluster 724 to be communicatively coupled to the weight DMA controller 718 via a respective sub-branch of the weight DMA bus 712. Similarly, one or more activation DMA controllers 716 may distribute activations to tensor processor clusters 724 via activation DMA bus 714. The network topology in which the activation DMA controller 716 is communicatively coupled to each of the tensor processor clusters 724 may allow each tensor processor within a tensor processor cluster 724 to be communicatively coupled to the activation DMA controller 716 via a respective sub-branch of the activation DMA bus 714. By structuring the weight DMA bus 718 and the activation DMA bus 716 according to a tree network topology (e.g., rather than a star or ring topology), the corresponding DMA controllers 718 and 716 may distribute neural network weights and activations to each tensor processor cluster 724 directly, thereby minimizing latency and overall power consumption. As such, the machine learning accelerator 700 may be suitable for AR/VR applications or other applications that require feature processing with minimal latency within a finite power budget.

Figure 7B:
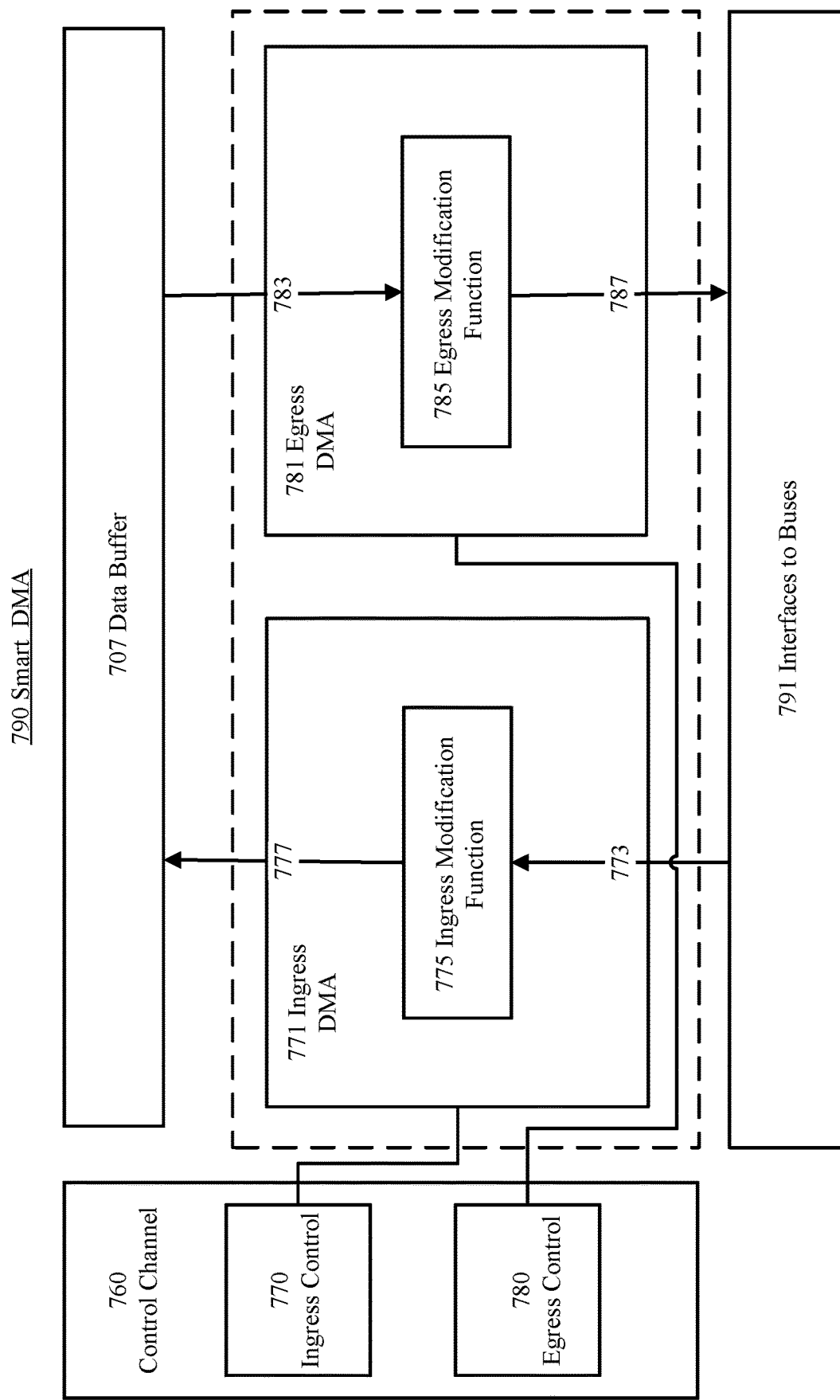
FIG. 7B illustrates selected logical elements of a smart DMA within an ML accelerator.

In particular embodiments, a smart DMA may comprise an ingress component that reads data from a source memory and writes the data to a data buffer and an egress component that reads data from the data buffer and writes the data to a destination memory. Each of the ingress component and the egress component of the smart DMA may run on a thread that is independent from each other. An n-dimensional loops executed on the ingress component thread may be independent from an n-dimensional loops executed on the egress component thread. In particular embodiments, the ingress component and the egress component of the smart DMA may be synchronized via synchronization tokens. FIG. 7B illustrates selected logical elements of a smart DMA within an ML accelerator. The smart DMA 790 illustrated in FIG. 7B may be an instance of a weight DMA 703, an activation DMA 705, or any suitable instance of smart DMA. As an example and not by way of limitation, a smart DMA 790 may comprise an ingress component and an egress component. The ingress component may comprise an ingress control 770 and an ingress DMA 771. The egress component may comprise an egress control 780 and an egress DMA 781. One or more control channels 760 may be associated with each smart DMA 790. A control channel 760 may comprise an ingress control 770 that may generate DMA instructions for the ingress DMA 771 at each iteration of n-dimensional loops executed by the ingress DMA 771 and an egress control 780 that may generate DMA instructions for the egress DMA 781 at each iteration of n-dimensional loops executed by the egress DMA 781. The smart DMA 790 may be communicably coupled to a data buffer 707. In particular embodiments, the data buffer 707 may be a part of the smart DMA 790. The smart DMA 790 may be communicably coupled to interfaces to buses 791 that may be communicable coupled to memories. Although this disclosure describes an ingress component and an egress component of a smart DMA in a particular manner, this disclosure contemplates an ingress component and an egress component of a smart DMA in any suitable manner.

In particular embodiments, the ingress component may be configured to read a first block of data from a first address of the source memory, process the first block of data with an ingress modification function, and store the first block of data to a second address of a data buffer at an iteration of a loop among the n-dimensional loops. The DMA instructions associated with the iteration of the loop may comprise information associated with the first address of the source memory, information associated with a size of the first block of data, information associated with the ingress modification function. The information associated with the first address of the source memory may comprise a base source address and a source address increment value for each dimension of the n-dimensional loops. The ingress modification function may perform zero or more first modifications to the first block of data based on the information associated with the ingress modification function. The zero or more first modifications may comprise a data decompression, or a data realignment. As an example and not by way of limitation, continuing with a prior example illustrated in FIG. 7B, the ingress control 770 may generate, at each iteration of n-dimensional loops, DMA requests with a source address indicating a location in a source memory, a target address indicating a location at the data buffer 707, a data block size, and parameters associated with the ingress modification function 775 to be performed on the data block based on DMA instructions. The ingress control 770 may send the generated DMA requests including source address, target address, data block size, and parameters associated with the ingress modification function 775 to the ingress DMA 771. The ingress DMA 771 may read a data block of the generated data block size from the location in the source memory indicated by the source address through an interface 791 to a bus communicably coupled with the source memory at step 773. In particular embodiments, each block read request may be chopped into a linear sequence of burst read transactions that would be sent to the interface 791. When the data block returns from the interface 791, The ingress DMA 771 may perform the ingress modification function 775 on the retrieved data block based on the parameters received from the ingress control 770. In particular embodiments, the ingress modification function 775 may perform zero modification. In particular embodiments, the ingress modification function 775 may perform a data decompression on the retrieved data block. In particular embodiments, the ingress modification function 775 may perform a data realignment on the retrieved data block. In particular embodiments, the ingress modification function 775 may perform a data decompression and a data realignment on the retrieved data block. At step 777, the ingress DMA 771 may write the data block that is processed by the ingress modification function 775 to a location at the data buffer 707 indicated by the target address. Although this disclosure describes transferring a block of data from a source address indicating a location in a source memory to a target address indicating a location at a data buffer at an iteration of n-dimensional loops in a particular manner, this disclosure contemplates transferring a block of data from a source address indicating a location in a source memory to a target address indicating a location at a data buffer at an iteration of n-dimensional loops in any suitable manner.

In particular embodiments, the egress component may be configured to read a second block of data from a third address of the data buffer, process the second block of data with an egress modification function, and store the second block to a fourth address of the destination memory at an iteration of the loop among the n-dimensional loops. The DMA instructions associated with the iteration of the loop may comprise information associated with the egress modification function, and information associated with the fourth address of the destination memory. The information associated with the fourth address of the destination memory may comprise a base destination address and a destination address increment value for each dimension of the n-dimensional loops. The egress modification function may perform zero or more second modifications to the second block of data based on the information associated with the egress modification function. The zero or more second modifications may comprise a data realignment, a conversion of RGB codes to RGB0 codes, or a tensor transpose. As an example and not by way of limitation, continuing with a prior example illustrated in FIG. 7B, the egress control 780 may generate, at each iteration of n-dimensional loops, DMA requests with a source address indicating a location at the data buffer 707, a destination address indicating a location in a destination memory, a data block size, and parameters associated with the egress modification function 785 to be performed on the data block based on DMA instructions. The egress control 780 may send the DMA requests with the generated source address, destination address, data block size, and parameters associated with the egress modification function 785 to the egress DMA 781. The egress DMA 781 may read a data block of the generated data block size from a location at the data buffer 707 indicated by the source address at step 783. In particular embodiments, each block read request may be chopped into linear single-beat read transactions and sent to the data buffer 707. The egress DMA 781 may perform the egress modification function 785 on the retrieved data block based on the parameters received from the egress control 780. In particular embodiments, the egress modification function 785 may perform zero modification. In particular embodiments, the egress modification function 785 may perform a data realignment on the retrieved data block. In particular embodiments, the egress modification function 785 may perform a conversion of RGB codes to RGB0 codes on the retrieved data block. In particular embodiments, the egress modification function 785 may perform a tensor transpose on the retrieved data block. In particular embodiments, the egress modification function 785 may perform any possible combination of a data realignment, a conversion of RGB codes to RGB0 codes, and a tensor transpose on the retrieved data block. At step 787, the egress DMA 781 may write the data block that is processed by the egress modification function 785 to a location in the destination memory indicated by the destination address through an interface 791 to a bus communicably coupled with the destination memory. In particular embodiments, egress component may optionally be configured to write back to the data buffer 707 as a destination memory. Although this disclosure describes transferring a block of data from a source address indicating a location at a data buffer to a destination address indicating a location at a destination memory at an iteration of n-dimensional loops in a particular manner, this disclosure contemplates transferring a block of data from a source address indicating a location at a data buffer to a destination address indicating a location at a destination memory at an iteration of n-dimensional loops in any suitable manner.

In particular embodiments, the ingress component may be further configured to send a token to the egress component to indicate that the first block of data is available in the data buffer. The egress component may be further configured to determine that the second block of data is available at the data buffer based at least on a token sent by the ingress component indicating that the second block of data is available at the third address of the data buffer before the egress component reads the second block of data. As an example and not by way of limitation, continuing with a prior example illustrated in FIG. 7B, the ingress control 770 may send a token indicating that a data block is available at the data buffer 707 to the egress control 780. Upon receiving the token from the ingress control 770, the egress control 780 may determine that the data block is available at the data buffer 707. The egress control 780 may generate instructions for transferring this data block from the data buffer 707 to a destination memory at a following iteration and send the generated instructions to the egress DMA 781. The egress DMA 781 may retrieve the data block from the data buffer 707, run an egress modification function 785 on the retrieved data block, and write the data block to the destination memory based on the instructions received from the egress control 780. Although this disclosure describes a token transmission from the ingress component to the egress component to indicate that a data block is available at the data buffer in a particular manner, this disclosure contemplates a token transmission from the ingress component to the egress component to indicate that a data block is available at the data buffer in any suitable manner.

In particular embodiments, the egress component may be further configured to send a first token to a data consuming thread of the second block of data to inform that the second block of data is available. In particular embodiments, the first token may be a special packet following the second block of data. The egress component may also be configured to send a second token to the ingress component to inform that the second block of data is transferred from the data buffer. The ingress component may be configured to determine whether the data buffer has enough space to store the first block of data based at least on a token from the egress component indicating a block of data is transferred from the data buffer. As an example and not by way of limitation, when the egress DMA 781 associated with an activation DMA 705 transfers a block of data to an activation memory of a tensor processor cluster 724, the egress DMA 781 may send a special packet following the block of data to inform a data consuming thread that the data block is available at the activation memory. The data consuming thread may determine that the block of data is available at the activation memory based on the special packet. The data consuming thread may send a token through the synch bus after moving the data block from the destination address. Although this disclosure describes a token transmission from the egress component to a data consuming thread in a particular manner, this disclosure contemplates a token transmission from the egress component to a data consuming thread in any suitable manner.

In particular embodiments, the egress control 780 may also send a token to the ingress control 770 indicating that the data block is transferred. Upon receiving the token from the egress control 780, the ingress control 770 may determine that the address space used to store the data block at the data buffer 707 becomes available for another data block. Although this disclosure describes a token transmission from the egress component to the ingress component in a particular manner, this disclosure contemplates a token transmission from the egress component to the ingress component in any suitable manner.

Figure 7C:
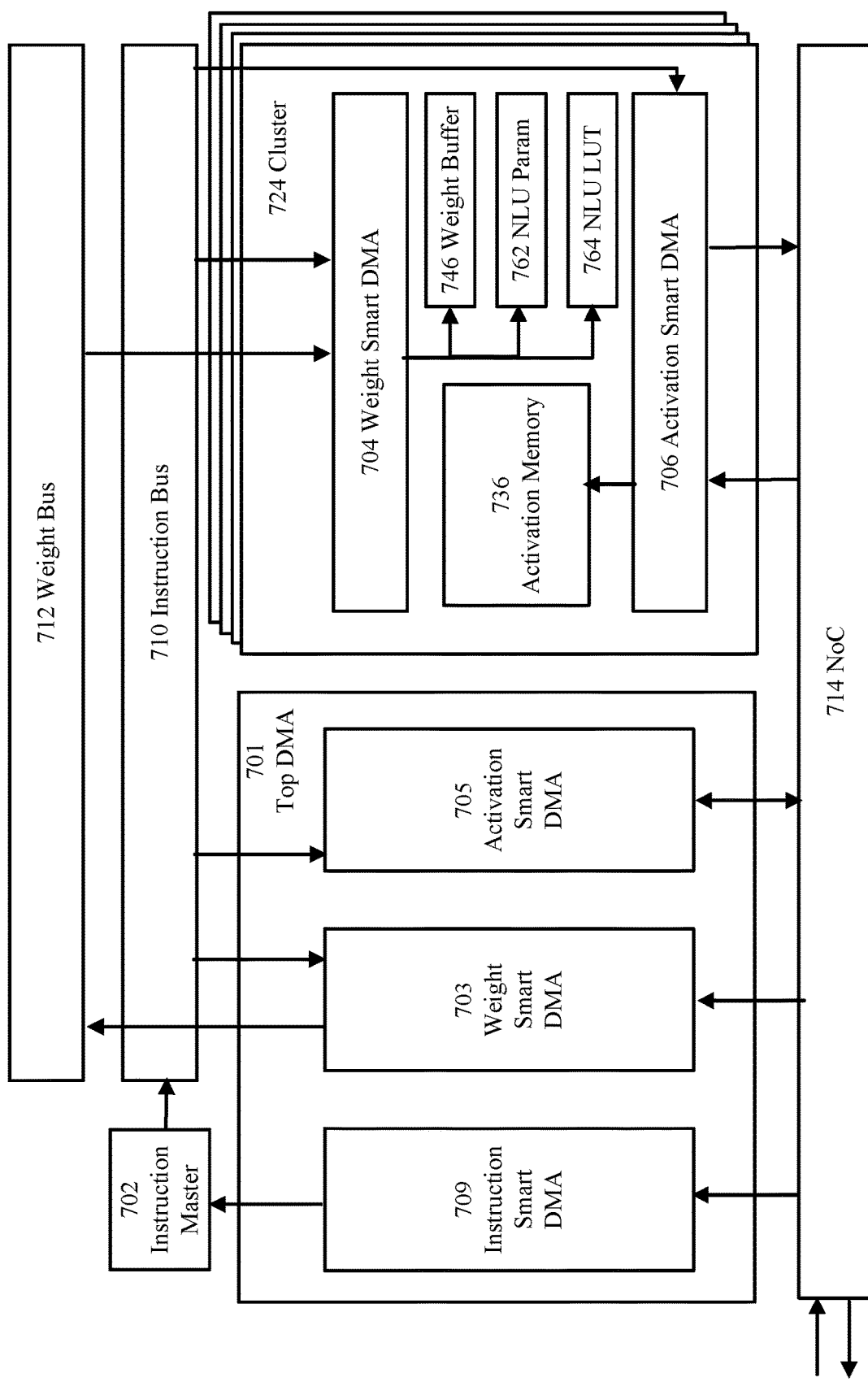
FIG. 7C illustrates example connectivity of smart DMAs within an ML accelerator.

FIG. 7C illustrates example connectivity of smart DMAs within an ML accelerator. The smart DMAs may be communicably coupled to a plurality of buses. The buses may include NoC 714 that connects external memory and cluster activation buffers 736, weight bus 712 that connects weight Smart DMA 703 to cluster weight buffer 746, NLU param 762 and NLU LUT 764, instruction bus 710 that connects instruction master 702 to all control agents in the ML accelerator 700, and synch bus (not shown) that connects sync master and all control agents in the ML accelerator 700.

In particular embodiments, the smart DMA may be an activation smart DMA 705 that transfers activations from an external memory to cluster activation buffers 736 though NoC 714. In particular embodiments, the activation smart DMA 705 may also be used for halo transfers, fill to activation memory, and transferring activation output to the external memory. The activation smart DMA may comprise k control channels, wherein k is a number of tensor processor clusters in the ML accelerator 700. The ingress modification function 775 for the activation smart DMA 705 may support the data realignment. The egress modification function 785 for the activation smart DMA 705 may support the conversion of RGB codes to RGB0 codes. Although this disclosure describes a particular activation smart DMA, this disclosure contemplates any suitable activation smart DMA.

In particular embodiments, the smart DMA may be a weight smart DMA 703 that transfers weights, non-linear unit parameters, or look-up table values from an external memory to one or more clusters through weight bus 712. The ingress modification function 775 for the weight smart DMA 703 may support the data decompression and the data realignment. The egress modification function 785 for the weight smart DMA 703 may support the data realignment, the tensor transpose and shuffle. Although this disclosure describes a particular weight smart DMA, this disclosure contemplates any suitable weight smart DMA.

In particular embodiments, the smart DMA may be an instruction smart DMA 709 that may be used for fetching instructions from an external memory to the instruction master 702. The instruction smart DMA 709 may comprise only ingress component that reads instructions from the external memory and writes the instructions to the instruction master 702. Although this disclosure describes a particular instruction smart DMA, this disclosure contemplates any suitable instruction smart DMA.

In particular embodiments, the smart DMA may be a cluster activation smart DMA 706 that may be used for intra-cluster and inter-cluster halo transfers and fills, as well as transferring activation output to an external memory. Each tensor processor cluster may have one cluster activation smart DMA 706. The cluster activation smart DMA 706 may comprise only egress component. The cluster activation smart DMA 706 may regard the activation buffer 736 in the same tensor processor cluster as local activation memory while the cluster activation smart DMA 706 may regard the activation buffer 736 in different tensor processor cluster as remote activation memory. Thus, the local activation memory may be treated as a data buffer and the remote activation memory may be treated as a destination memory. The cluster activation smart DMA 706 may also support local forwarding in which data is written to a location activation memory. Each cluster activation smart DMA 706 may be associated with a single control channel. The egress modification function 785 for the cluster activation smart DMA 706 may support a tensor transpose and the data realignment. Although this disclosure describes a particular cluster activation smart DMA, this disclosure contemplates any suitable cluster activation smart DMA.

Figure 7D:
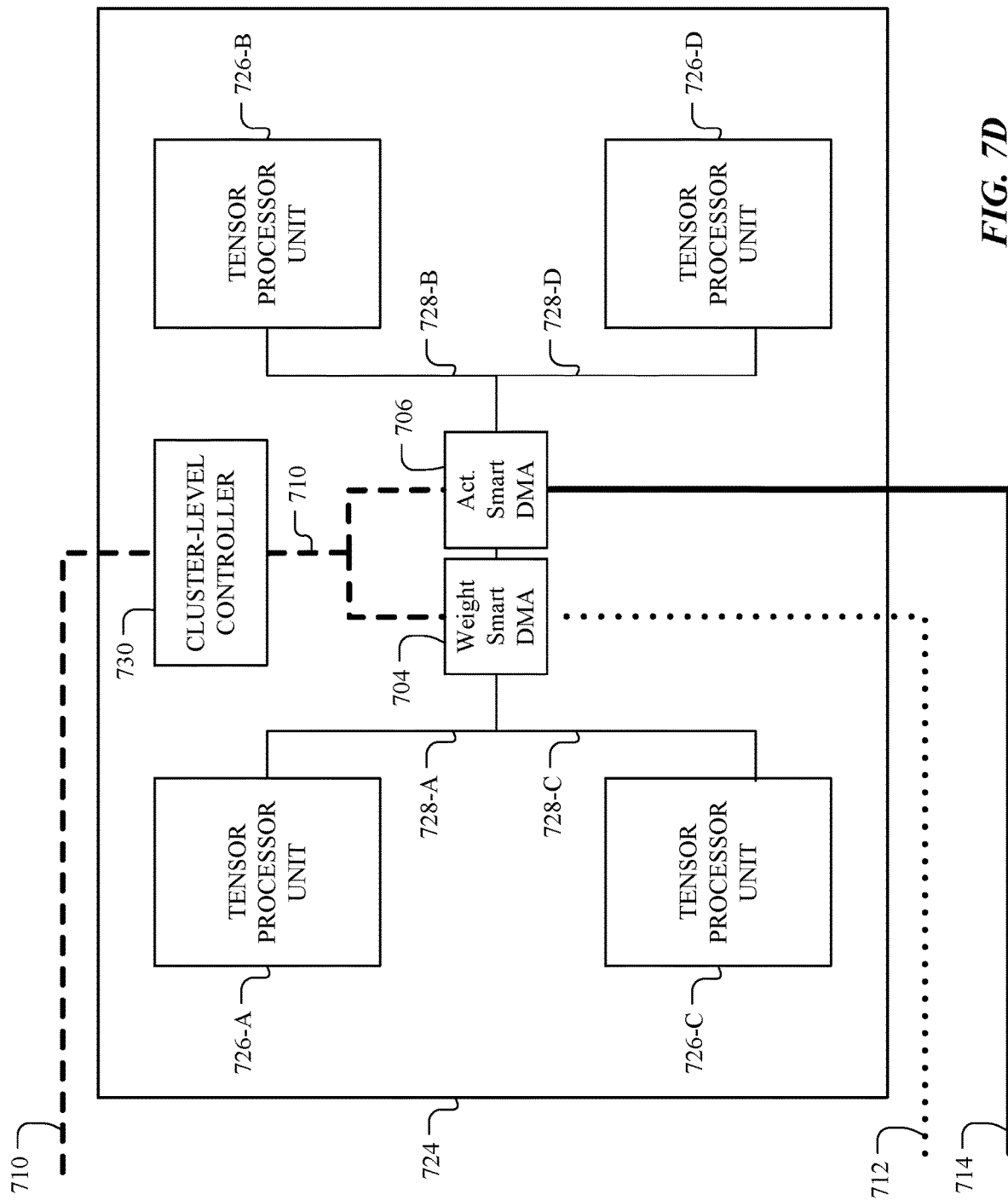
FIG. 7D illustrates selected elements of an example tensor processor cluster.

FIG. 7D illustrates selected elements of an example tensor processor cluster, such as one of the four tensor processor clusters 724 of ML accelerator 700 illustrated in FIG. 7A. In this example, tensor processor cluster 724 includes four tensor processor units 726-A through D, a shared cluster-level controller with synchronizer 730, a cluster weight smart DMA 704, a cluster activation smart DMA 706, and four DMA bus sub-branches 728-A through D communicably coupling tensor processor units 726 to weight DMA bus 712 and activation DMA bus 714.

In one embodiment, cluster-level controller 730 may comprise a system, device, or apparatus generally operable to interpret coarse-grained tensor instructions received from a compiler, such as compiler 600 illustrated in FIG. 6, and translate it into a series of fine-grained tensor instructions that may be sent to tensor processor units 726 in tensor processor cluster 724 tasked with performing a common series of operations. Each of these fine-grained tensor instructions may include neural network operations (e.g., convolution, bias-add, normalization, pooling, and the like) to be performed by hardware compute arrays within each tensor processor unit 726 or may represent a non-linear instruction to be applied to an intermediate output of the hardware compute arrays to produce an element of an output feature. In addition, cluster-level controller 730 may include synchronizers that synchronize the operations of the tensor processor units 726 within tensor processor cluster 724 so that they may perform the common series of operations in parallel and in lockstep. In particular, cluster-level controller 730 may use the synchronizers to generate a token indicating that tensor processor units 726 have completed the common series of operations and that the tensor data was processed. In one embodiment, cluster-level controller 730 may send the token to activation DMA controller 716 such that activation DMA controller 716 may instruct cluster activation smart DMA 706 to retrieve additional tensor data from data buffer 707 to distribute to tensor processor units 726 for further processing in lockstep. Cluster-level controller 730 may ensure that the appropriate subsets of the tensor data and the set of weights to be applied for each operation have been loaded into the local memory of each tensor processor unit 726 tasked with performing the common series of operations. In one embodiment, this may include generating an address pattern for the weights and/or generating an address pattern for the outputs of the common series of operations.

In the example illustrated in FIG. 7D, cluster-level controller 730 receives tensor instructions (e.g., coarse-grained tensor instructions) over instruction bus 710. Each coarse-grained tensor instruction sent to a tensor processor cluster 724 may encode information usable by the tensor processor cluster 724 to perform a multi-cycle operation corresponding to a part of a single neural network layer. In one example, using a single-program-multiple-data (SPMD) approach, compiler 600 (illustrated in FIG. 6) may distribute a workload such that different tasks are assigned to different tensor processor clusters 724 with some or all of the tensor processor clusters 724 operating on the same tensor data. In another example, using a single-instruction-multiple-data (SIMD) approach, compiler 600 may distribute the workload such that the same tasks are assigned to multiple tensor processor clusters 724 and such that each of those multiple tensor processor clusters 724 operates on different tensor data, such as on a different subset of an input feature for the neural network. Using this approach, the tensor processor clusters 724 may operate in parallel and may typically, but not necessarily, operate in lockstep with one another.

In particular embodiments, the cluster activation smart DMA 706 and the cluster weight smart DMA 704 may be communicably coupled to an activation DMA 705 and a weight DMA 703, such as those illustrated in FIG. 7A, over activation DMA bus 714 and weight DMA bus 712, respectively, to provide the appropriate weights and input features to each tensor processor unit 726 in each cycle. In the example tensor processor cluster 724, each of the four tensor processor units 726A-D may operate on one-quarter of the input features allocated to tensor processor cluster 724 by the compiler, as provided by the cluster activation smart DMA 706. In particular embodiments, the cluster activation smart DMA 706 and the synchronizers within cluster-level controller 730 may make it possible to share edge pixels between layers. For example, the cluster activation smart DMA 706 may be coupled with the synchronizers to help move output edge pixels from the activation memories of particular tensor processor units 726 to the activation memories of other tensor processor units 726 for computing the next layer output. In some cases, such as when the dimensions of the output feature map are different than the dimensions of the input feature map for the next layer, each tensor processor unit 726 may require output features generated by more than one tensor processor unit 726 as input features for computing the next layer output. In particular embodiments, the synchronizers may schedule DMA operations to move the data based on information encoded in the multi-cycle instructions by the compiler and received by cluster-level controller 730.

Because the tensor processors within a given tensor processor cluster operate in parallel and lock step to perform the same sequence of vector operations in accordance with a common recipe, each tensor processor may be configured to perform the same amount of work. However, the amount of work to be done, collectively, by the tensor processor units might not be divisible across the tensor processor units in a way that utilizes all of the available computing resources in the tensor processor units. In particular embodiments, the compiler may "round up" the amount of work allocated to each tensor processor cluster to match the number and dimensions of the tensor processor units and MAC computation units thereof, such as by zero padding the spatial partition of the input feature map provided to the cluster to maintain symmetry between the tensor processor units. The zero padding may be applied by the compiler at different levels of the multi-level control architecture, in different embodiments. In one example, if a given cluster is to compute a 3×3 output tensor and the cluster includes four tensor processor units, the compiler may apply zero padding to the respective spatial partition of the input tensor assigned to the cluster in the x and y dimensions such that the computation generates a 4×4 output tensor that is divisible across the four tensor processor units, portions of which may be discarded or ignored. In another example, zero padding may be applied at a lower level of the multi-level control architecture. For example, a particular tensor processor unit may be configured to generate outputs in 32 channels, but the convolution operation to be performed by the tensor processor unit may produce an output tensor having only 30 channels. In this example, the compiler may apply zero padding to expand the dimensions of the computation to match the dimensions of the output tensor.

Figure 7E:
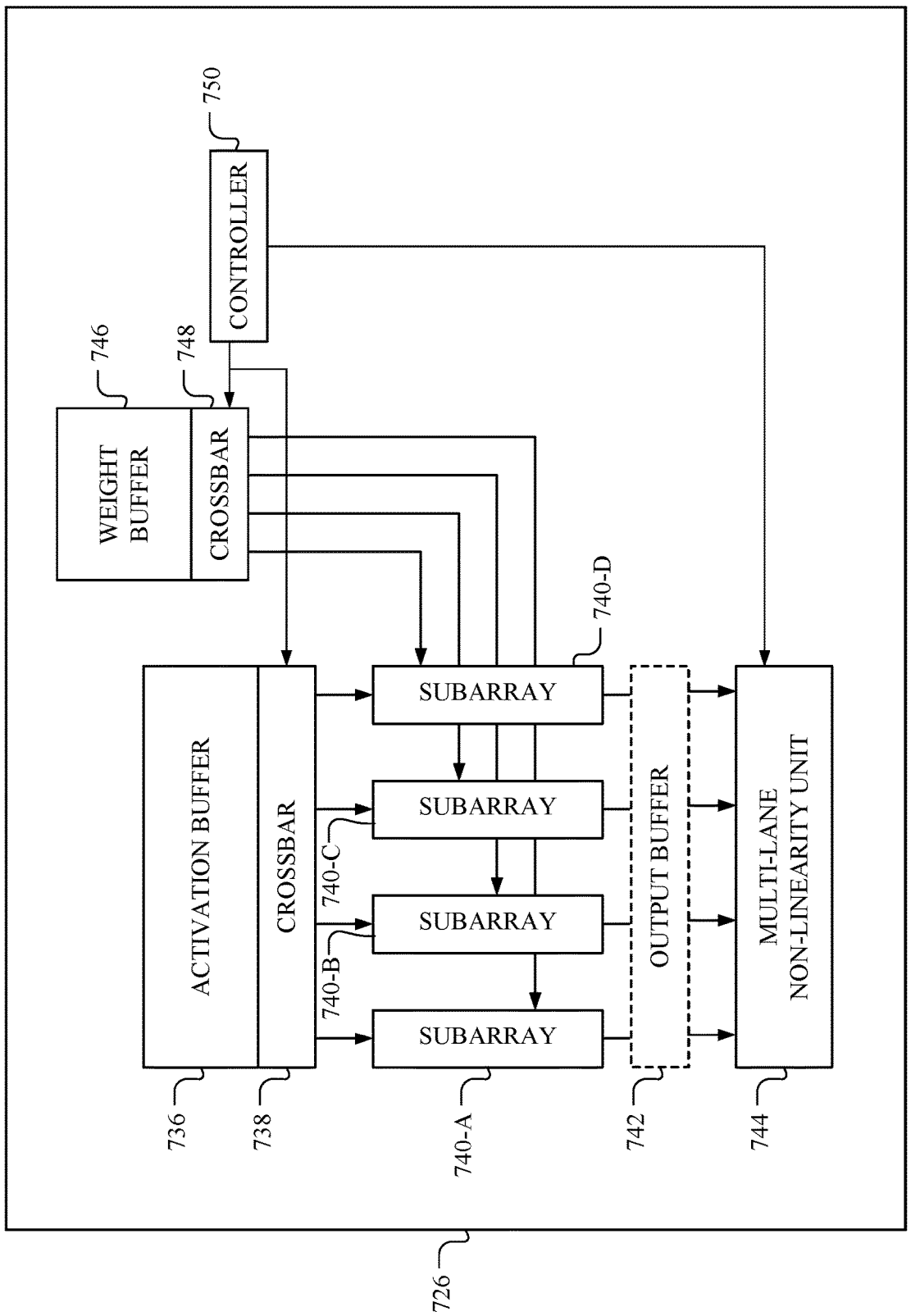
FIG. 7E illustrates selected elements of an example tensor processor unit.

Convolutional neural networks used in AR/VR applications must typically support input and output feature maps with a wide variety of shapes and sizes, especially along the channel dimension. With existing ASIC accelerators, supporting this diversity can result in decreased hardware utilization and a corresponding loss of performance and energy efficiency. The tensor processor units described in this application address this problem using flexible hardware resources and flexible computation-to-hardware mapping. For example, FIG. 7E illustrates selected elements of an example tensor processor unit 726, such as one of the four tensor processor units 726 of tensor processor cluster 724 illustrated in FIG. 7D. In particular embodiments, tensor processor unit 726 is implemented with a flexible architecture in which computation components are organized such that the tensor processor unit 726 can support a variety of convolutional layer shapes with high resource utilization and high reuse of locally available data. The tensor processor unit 726 may be a SIMD machine that includes a compute array capable of performing vector operations that collectively implement higher-level tensor instructions using data parallelism or model parallelism in a neural network. In the example illustrated in FIG. 7E, tensor processor unit 726 includes an activation buffer 736, a first crossbar 738, four compute subarrays 740, an optional output buffer 742, a multi-lane non-linearity unit 744, a weight buffer 746, e.g., a register file storing weights, a second crossbar 748, and a local controller 750. In particular embodiments, tensor processor unit 726 may, during operation, be dynamically configured to perform convolution operations of different sizes and shapes by controlling the size and shape of the input feature map data and weights supplied to each of the subarrays 740 and MAC computation units thereof using the flexible crossbars 738 and 748 and by controlling the reduction and/or combination of the outputs of each of the subarrays 740 and MAC computation units thereof to generate an output feature map of a desired size and shape. In particular embodiments, tensor processor unit 726 may also be configured to perform group convolution operations in which not all output elements depend on the same input elements or weights.

In the illustrated example, activation buffer 736 includes local memory elements that store tensor data (e.g., input feature map elements) to be provided to various ones of the subarrays 740. The first crossbar 738 is a first flexible many-to-many crossbar that reads tensor data (e.g., pixel values) from activation buffer 736 and provides them to the appropriate subarrays 740 in each cycle. In the illustrated example, weight buffer 746, which may be implemented as a register file, includes local memory elements that store the filter weights to be provided to various ones of the subarrays 740. The second crossbar 748 is another flexible crossbar that loads filter weights from weight buffer 746 and provides them to the appropriate subarrays 740 in each cycle.

In particular embodiments, each of the four compute subarrays 740 includes an array of multiply-and-accumulate (MAC) computation units of a given size that operate in parallel to apply the weights defined for a given 2D kernel of a given 3D convolution filter to portions of an input feature map and produce portions of an output feature map. The output feature map may have a different shape than the input feature map. A local controller 750 within tensor processor unit 726 may, e.g., in conjunction with a shared cluster-level controller, such as shared cluster-level controller 730 illustrated in FIG. 7D, control the operation of the crossbars 738 and 748 and the flexible reduction module or multi-lane non-linearity unit 744, in accordance with the coarse-grained tensor instructions received from compiler 600 illustrated in FIG. 6 and/or fine-grained instructions received from the shared cluster-level controller 730.

In particular embodiments, the optional output buffer 742 stores intermediate outputs from one or more subarrays 740 such that partial results may be accumulated prior to passing them through a reduction module, thus reducing the scope and/or complexity of the reduction operation. In particular embodiment, the multi-lane non-linearity unit 744 is a flexible reduction module configurable to take an intermediate computation output from the subarrays 740 and perform a reduction (i.e., addition) of subarray outputs to produce an output for tensor processor unit 726 as a whole, where appropriate.

In particular embodiments, a computing device may compute a tensor transpose in a memory efficient manner without sacrificing performance. Contemporary machine-learning (ML) models may require computing tensor transposes frequently. A computing device that is not equipped with an enhanced tensor transpose solution may load a tensor from a source memory to an intermediate memory buffer in a row-major order (or column-major order) and write the tensor to a target memory in a column-major order (or row-major order) to compute a transpose of the tensor. Because a typical memory buffer (e.g., static random-access memory (SRAM)) only allows sequential access, reading the tensor, which was written in the row-major order, from the intermediate memory buffer in the column-major order may result in reading one data element from a row at a time. Thus, the computing device may end up with writing one data element to the target address in a cycle, which would result in significant waste of bandwidth of the intermediate memory buffer and a data bus.

Figure 8A:
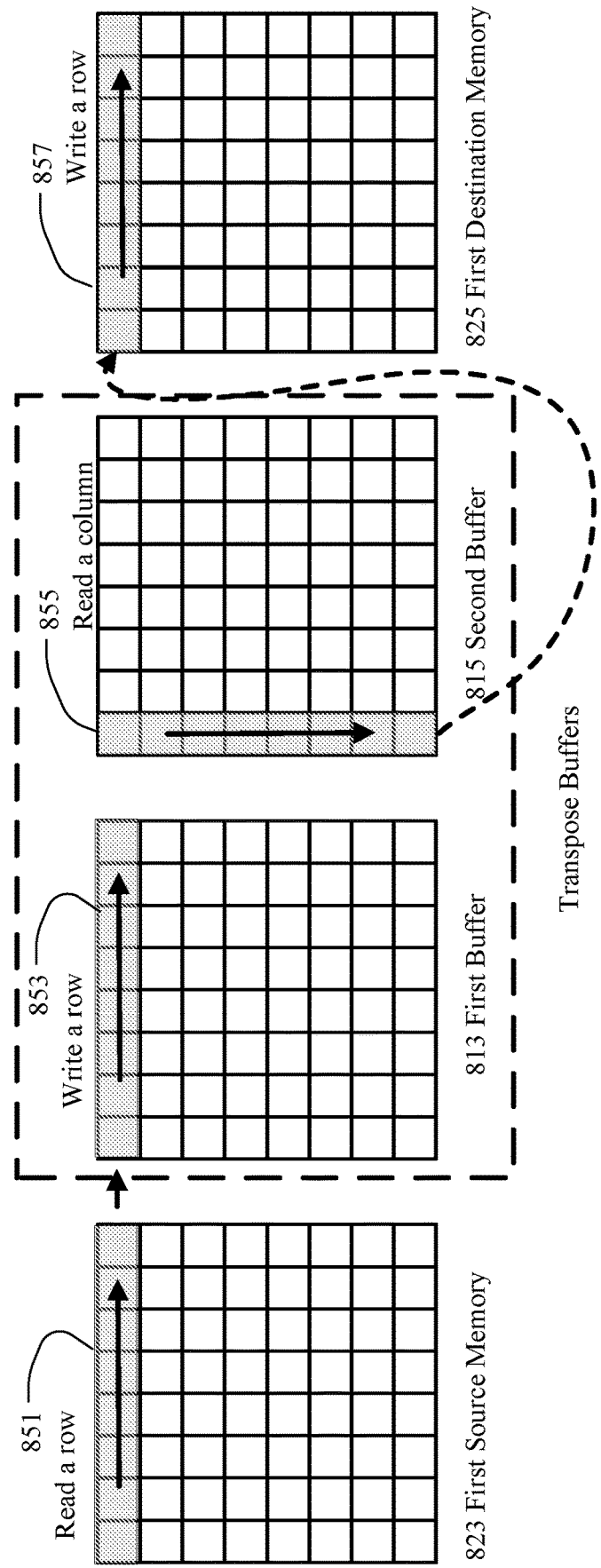
FIGS. 8A-8B illustrate example tensor transposes using double transpose buffers.
Figure 8B:
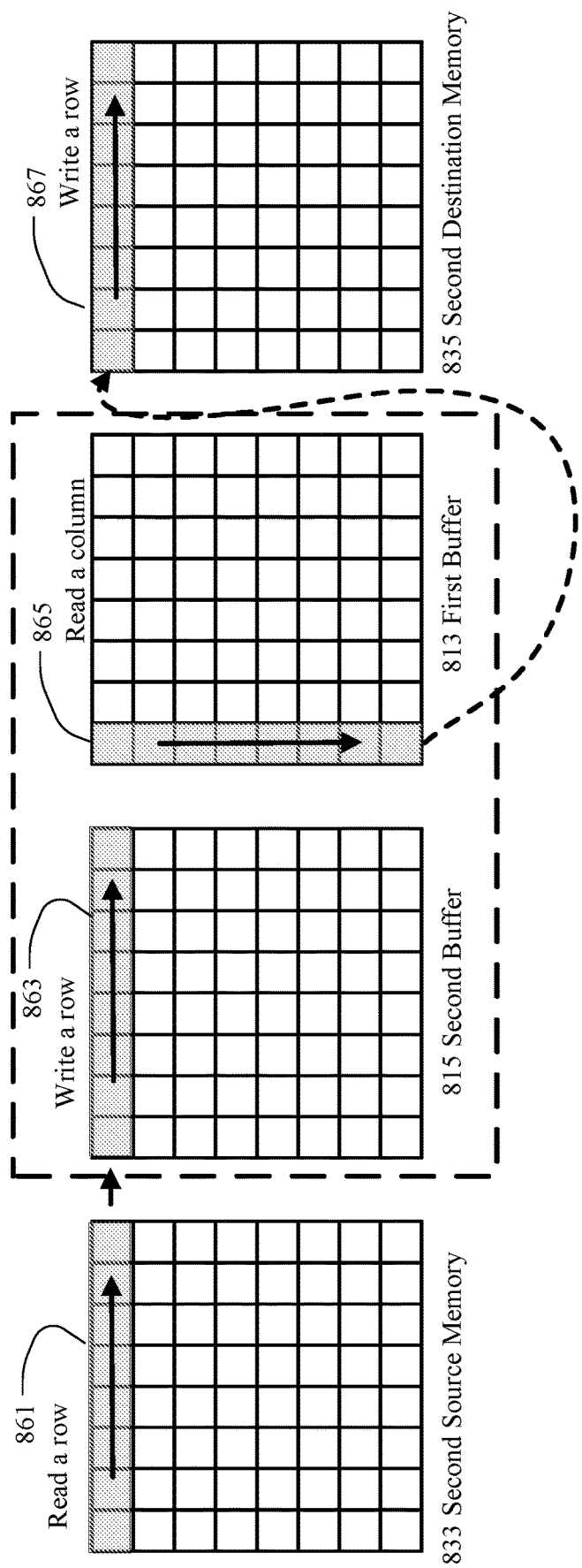

To improve the performance of the operation, a solution utilizing two D Flip-Flop memory buffers, called double buffering, has been introduced. While a first agent is writing a first tensor from a first source memory to a first transpose buffer in a first order (either a row-major order or a column-major order), a second agent is reading a second tensor from a second transpose buffer in a second order, which is different from the first order. The second tensor in the second transpose buffer is what was previously written by the first agent in the first order. FIGS. 8A-8B illustrate example tensor transposes using double transpose buffers. A computing device may comprise two transpose buffers 813 and 815. In the example illustrated in FIGS. 8A-8B, the transpose buffers 813 and 815 have eight rows and eight columns. In particular embodiments, the transpose buffers may have any suitable number of rows and columns. FIG. 8A illustrates a first iteration of a first loop, where the first loop comprises eight iterations, matching the number of rows/columns. The computing device may have two agents that operate independently from each other. During the first loop, a first agent may load a first tensor from a first source memory 823 to a first transpose buffer 813. A second agent may write a transpose of a second tensor, loaded to the second transpose buffer 815, to a first destination memory 825. During the first iteration of the first loop, the first agent may read a first row from the first tensor at step 851. At step 853, the first agent may write what was read at step 851 to a first row of the first transpose buffer 813. At step 855, the second agent may read a first column from the second transpose buffer 815. At step 857, the second agent may write what was read at step 855 to a first row of a tensor in the first destination memory 825. The second transpose buffer 815 was filled by the first agent in a previous loop. The first agent continues writing eight rows of the first transpose buffer 813 over the eight iterations of the first loop. The second agent continues reading eight columns of the second transpose buffer 815 over the eight iterations of the first loop. The steps 851 and 853 may occur simultaneously with the steps 855 and 857. Though the first agent writes data to the first row of the first transpose buffer 813 and the second agent reads data from the first column of the second transpose buffer 815 in the example illustrated in FIG. 8A, the first agent may write data to a first column of the first transpose buffer 813 and the second agent may read data from a first row of the second transpose buffer 815 in another example.

After finishing the first loop, the first agent may load a third tensor from a second source memory 833 to the second transpose buffer 815 during a second loop. The second agent may write a transpose of the first tensor to a second destination memory 835. FIG. 8B illustrates a first iteration of the second loop, which also comprises eight iterations. FIG. 8B switches the positions of the first transpose buffer 813 and the second transpose buffer 815 for simplicity's sake. The second loop illustrated in FIG. 8B follows the first loop illustrated in FIG. 8A. Thus, the first transpose buffer 813 contains the first tensor that the first agent loaded from the first source memory 823 in the row-major order. During the first iteration of the second loop, the first agent may read a first row from the third tensor from the second source memory 833 at step 861. The first agent may write what was read at step 861 to a first row of the second transpose buffer 815. At step 865, the second agent may read a first column from the first transpose buffer 813. At step 867, the second agent may write what was read at step 865 to a first row of a tensor in the second destination memory 835. The first agent continues loading eight rows of the third tensor from the second source memory 833 to eight rows of the second transpose buffer 815 over the eight iterations of the second loop. The second agent continues reading the first transpose buffer 813 in the column-major order and writing eight rows of the tensor in the second destination memory 835 over the eight iterations of the second loop. The steps 861 and 863 may occur simultaneously with the steps 865 and 867. Though the first agent writes data to the first row of the second transpose buffer 815 and the second agent reads data from the first column of the first transpose buffer 813 in the example illustrated in FIG. 8B, the first agent may write data to a first column of the second transpose buffer 815 and the second agent may read data from a first row of the first transpose buffer 813 in another example. This solution may allow utilizing the full bandwidth. However, the double buffering requires two buffers, which result in waste of memory.

A new solution disclosed in this application utilizes only one D Flip-Flop transpose buffer yet achieves identical performance of the double buffering solution. As a D Flip-Flop is a digital electronic circuit used to delay the change of state of its output signal until the next rising edge of a clock timing input signal occurs, the D Flip-Flop transpose buffer allows reading a first value from a memory space and writing a second value to the memory space at the same time. The computing device may read a first tensor from the D Flip-Flop transpose buffer and write a second tensor to the D Flip-Flop transpose buffer in a first order (either a row-major order or a column-major order). The computing device may read and write one row or column at a time depending on the first order. After finishing reading the first tensor and writing the second tensor in k cycles, where k is a number of rows or columns, the computing device may switch the order from the first order to a second order, where the second order is different from the first order. In other words, the second order may be the row-major order when the first order was the column-major order. Or, the second order maybe the column-major order when the first order was the row-major order. The computing device may read the second tensor from the D Flip-Flop transpose buffer and write a third tensor to the D Flip-Flop transpose buffer in the second order. By doing this, the computing device may achieve the throughput of the double buffering solution while utilizing only one buffer.

In particular embodiments, a computing system may comprise one or more source memories, one or more destination memories, a transpose buffer, and a hardware component. In particular embodiments, the transpose buffer is a D Flip-Flop memory. The transpose buffer may have N rows and N columns. At each iteration i among N iterations of a first loop, the hardware component may be configured to read first data corresponding to row i of a first tensor from a first source memory, read second data from column i of the transpose buffer, write the first data to column i of the transpose buffer, and cause the second data to be written to row i of a second tensor at a first destination memory. Reading the second data from column i of the transpose buffer and writing the first data to column i of the transpose buffer may occur simultaneously. After completing the first loop, the hardware component may be configured to run a second loop. At each iteration j among N iterations of a second loop, the hardware component may be configured to read third data corresponding to row j of a third tensor from a second source memory, read fourth data from row j of the transpose buffer, write the third data to row j of the transpose buffer, and cause the fourth data to be written to row j of a fourth tensor at a second destination memory. Reading the fourth data from row j of the transpose buffer and writing the third data to row j of the transpose buffer may occur simultaneously. The fourth tensor may be a transposed tensor of the first tensor. In particular embodiments, the computing system may be a machine-learning accelerator. In particular embodiments, the hardware component may be a direct memory access.

Figure 9A:
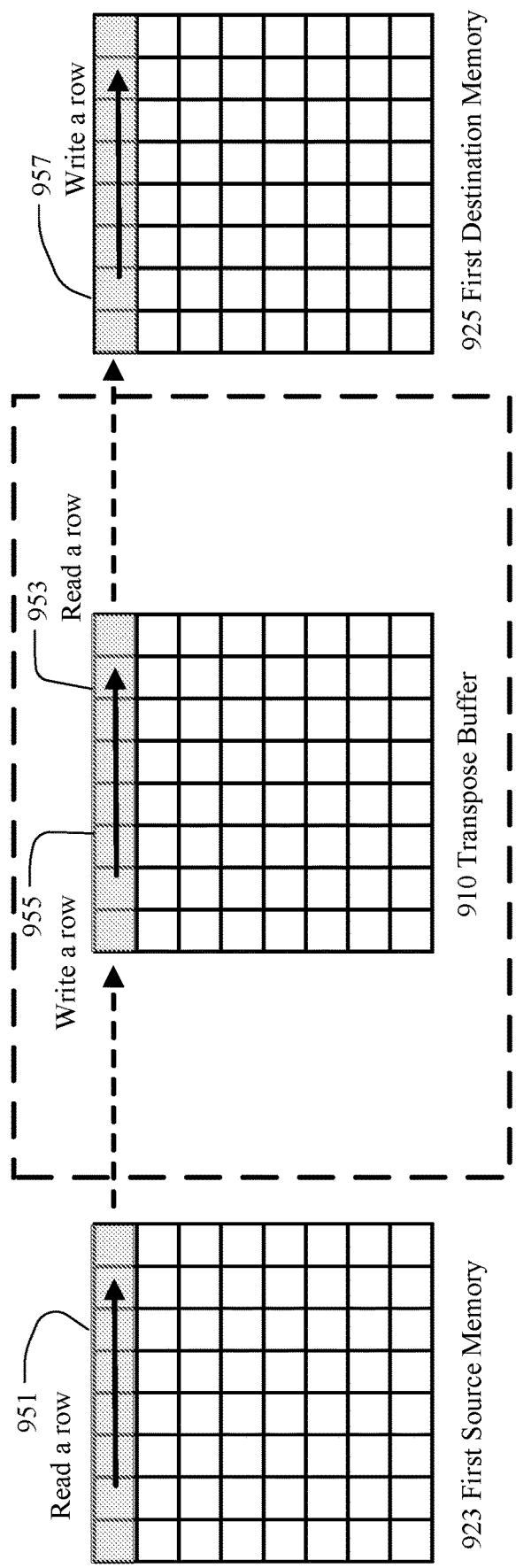
FIGS. 9A-9B illustrate example tensor transposes using a single D Flip-Flop transpose buffer.
Figure 9B:
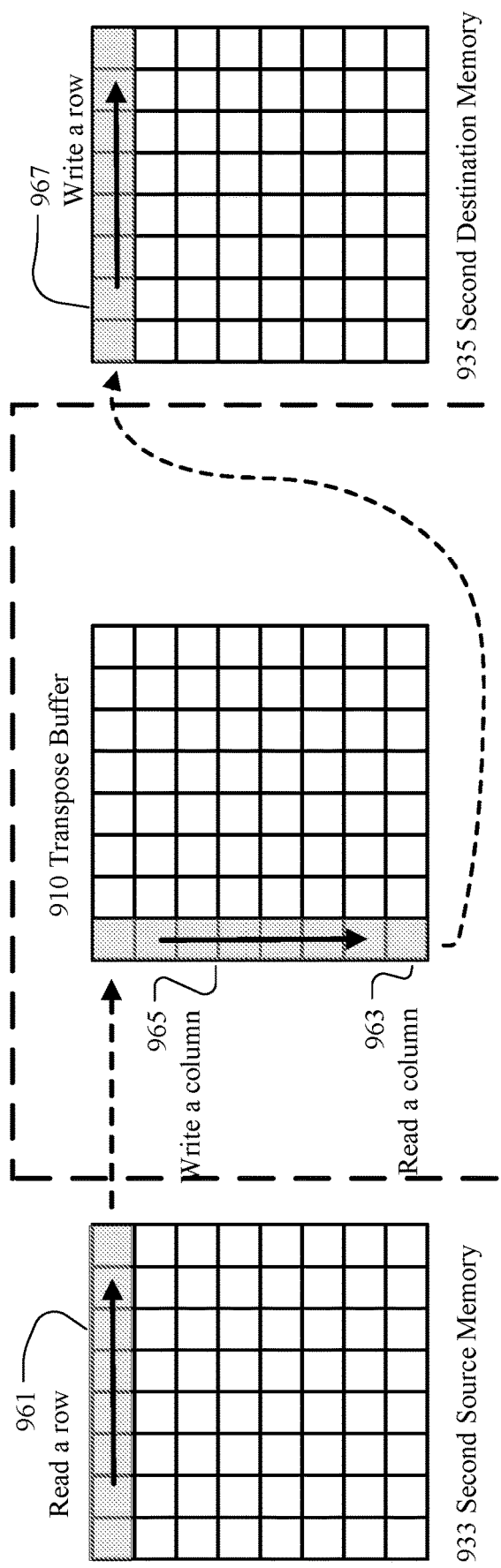

FIGS. 9A-9B illustrate example tensor transposes using a single D Flip-Flop transpose buffer. A computing device may comprise one D Flip-Flop transpose buffer 910. In the example illustrated in FIGS. 9A-9B, the D Flip-Flop transpose buffer 910 has eight rows and eight columns. In particular embodiments, the D Flip-Flop transpose buffer 910 may have any suitable number of rows and columns. FIG. 9A illustrates a first iteration of a first loop, where the first loop comprises eight iterations, matching the number of rows/columns of the D Flip-Flop transpose buffer 910. The computing device may have two agents that operate independently from each other. During the first loop, a first agent may load a first tensor from a first source memory 923 to the D Flip-Flop transpose buffer 910. A second agent may write a transpose of a second tensor, loaded to the D Flip-Flop transpose buffer 910 during a previous loop, to a first destination memory 925. During the first iteration of the first loop, the first agent may read a first row from the first tensor at the first source memory 923 at step 951. At step 955, the first agent may write what was read at step 951 to a first row of the D Flip-Flop transpose buffer 910. At step 953, the second agent may read the first row of the D Flip-Flop transpose buffer 910. The second agent may read what the first agent wrote in the previous loop. Even though steps 953 and 955 occur simultaneously, reading by the second agent is not interfered by writing by the first agent because of the characteristics of D Flip-Flop memory. At step 957, the second agent may write what was read at step 953 to a first row of a tensor in the first destination memory 925. The first agent continues writing eight rows of the D Flip-Flop transpose buffer 910 over the eight iterations of the first loop. The second agent continues reading eight rows of the D Flip-Flop transpose buffer 910 over the eight iterations of the first loop without being interfered by writing of the first agent.

After finishing the first loop, the first agent may load a third tensor from a second source memory 933 to the D Flip-Flop transpose buffer 910 during a second loop. The second agent may write a transpose of the first tensor to a second destination memory 935. FIG. 9B illustrates a first iteration of the second loop, which also comprises eight iterations. The second loop illustrated in FIG. 9B follows the first loop illustrated in FIG. 9A. Thus, the D Flip-Flop transpose buffer 910 contains the first tensor that the first agent loaded from the first source memory 923 in the row-major order. During the first iteration of the second loop, the first agent may read a first row from the third tensor from the second source memory 933 at step 961. At step 965, the first agent may write what was read at step 961 to a first column of the D Flip-Flop transpose buffer 910. At step 963, the second agent may read a first column from the D Flip-Flop transpose buffer 910, which contains the first tensor loaded in the row-major order in the previous loop by the first agent. At step 967, the second agent may write what was read at step 963 to a first row of a tensor in the second destination memory 935. The first agent continues loading eight rows of the third tensor from the second source memory 833 to eight columns of the D Flip-Flop transpose buffer 910 over the eight iterations of the second loop. The second agent continues reading eight columns of the D Flip-Flop transpose buffer 910, which was written in the row-major order in the previous loop by the first agent, and writing eight rows of the tensor in the second destination memory 835 over the eight iterations of the second loop. While steps 963 and 965 may occur simultaneously, reading at step 963 does not get interfered by writing at step 965 because of the characteristics of D Flip-Flop memory. The solution disclosed herein may allow utilizing the full bandwidth of the buffer and the data bus with only one transpose buffer.

In particular embodiments, the computing system may alternate an accessing order for the D Flip-Flop transpose buffer at a beginning of each loop. In particular embodiments, the computing system may be an ML accelerator 614. The tensor transpose using a single D Flip-Flop transpose buffer may be performed as a part of an egress modification function 785 of a smart DMA. In particular embodiments, the tensor transpose using a single D Flip-Flop transpose buffer may be performed by any suitable hardware module of the ML accelerator. Although this disclosure describes a particular type of the transpose buffer, this disclosure contemplates any suitable type of the transpose buffer.

In particular embodiments, a machine learning accelerator may perform a batch matrix multiplication between two activation tensors in a machine learning accelerator in an efficient manner. A legacy machine-learning accelerator may be designed for computing CNN/Multilayer Perceptron (MLP) types of workloads, where Multiply-and-Accumulate (MAC)/General Matrix Multiplication (GEMM) operators are between offline-trained weights and runtime-generated activations. A typical MAC unit used by a machine learning accelerator may be designed to compute a multiplication between an eight-byte input activation vector with a 32-byte 8-by-8 weight matrix, where each element of the weight matrix is four bits. As machine-learning models that use the attention mechanism are emerging, evolving the machine-learning accelerator architecture and software toolchain to support activation to activation multiplications becomes critical. Particular embodiments described herein may provide a way to reuse the weight matrix for a second activation tensor for a bmm operation.

In particular embodiments, a computing system 700 for accelerating machine-learning computations may comprise a plurality of tensor processor clusters 724 and an instruction master 702 that provides instructions operable when executed by the plurality of tensor processor clusters. Each of the plurality of tensor processor clusters may comprise a plurality of tensor processor units 726, a cluster activation DMA 706, and a cluster weight DMA 704. In particular embodiments, the computing system 700 may determine that a batch matrix multiplication (bmm) operation between a first activation tensor and a second activation tensor needs to be performed. As an example and not by way of limitation, the machine learning accelerator 700 may perform a multi-headed self-attention computation illustrated in FIG. 5C either in the traditional multi-headed self-attention flow 570 or in the fast attention flow 580. In either flow, the machine learning accelerator 700 may need to perform bmm operations two times. For each bmm instance, the machine learning accelerator 700 may determine that a multiplication between two activation tensors is needed. Although this disclosure describes determining that a multiplication between a first activation tensor and a second activation tensor is needed in a particular manner, this disclosure contemplates determining that a multiplication between a first activation tensor and a second activation tensor is needed in any suitable manner.

In particular embodiments, the first activation tensor and the second activation tensor may be distributed in activation buffers 736 of N tensor processor units 726. In particular embodiments, the first activation tensor and the second activation tensor may be output of respective operations that are performed by the N tensor processor units 726 in distributed manners. As an example and not by way of limitation, the first bmm operation in flow 570 is a multiplication between a query tensor and a key tensor, both of which are output of linear operations. As the previous linear operations are performed by the N tensor processor units 726 in distributed manners, the output of those operations is distributed in the activation buffers 736 of the N tensor processor units 726. The second bmm operation in flow 670 is a multiplication between an output of a softmax operation and a value tensor, which is an output of a linear operation. The softmax operation and the linear operation are performed by the N tensor processor units 726 in distributed manners. Thus, the output of those operations is distributed in the activation buffers 736 of the N tensor processor units 726. As another example and not by way of limitation, the first bmm operation in the fast attention flow 580 is a multiplication between an output of an L2-Norm and an output of a linear operation. The second bmm operation in flow 580 is a multiplication between an output of an L2-Norm operation and an output of the first bmm operation. As the L2-Norm operations, linear operation and the bmm operation are performed by the N tensor processor units 726 in distributed manners, the input tensors for the bmm operations are distributed in the activation buffers 736 of the N tensor processor units 726. Although this disclosure describes input tensors for a bmm operation being distributed in the activation buffers of the N tensor processor units in a particular manner, this disclosure contemplates input tensors for a bmm operation being distributed in the activation buffers of the N tensor processor units in any suitable manner.

Figure 10:
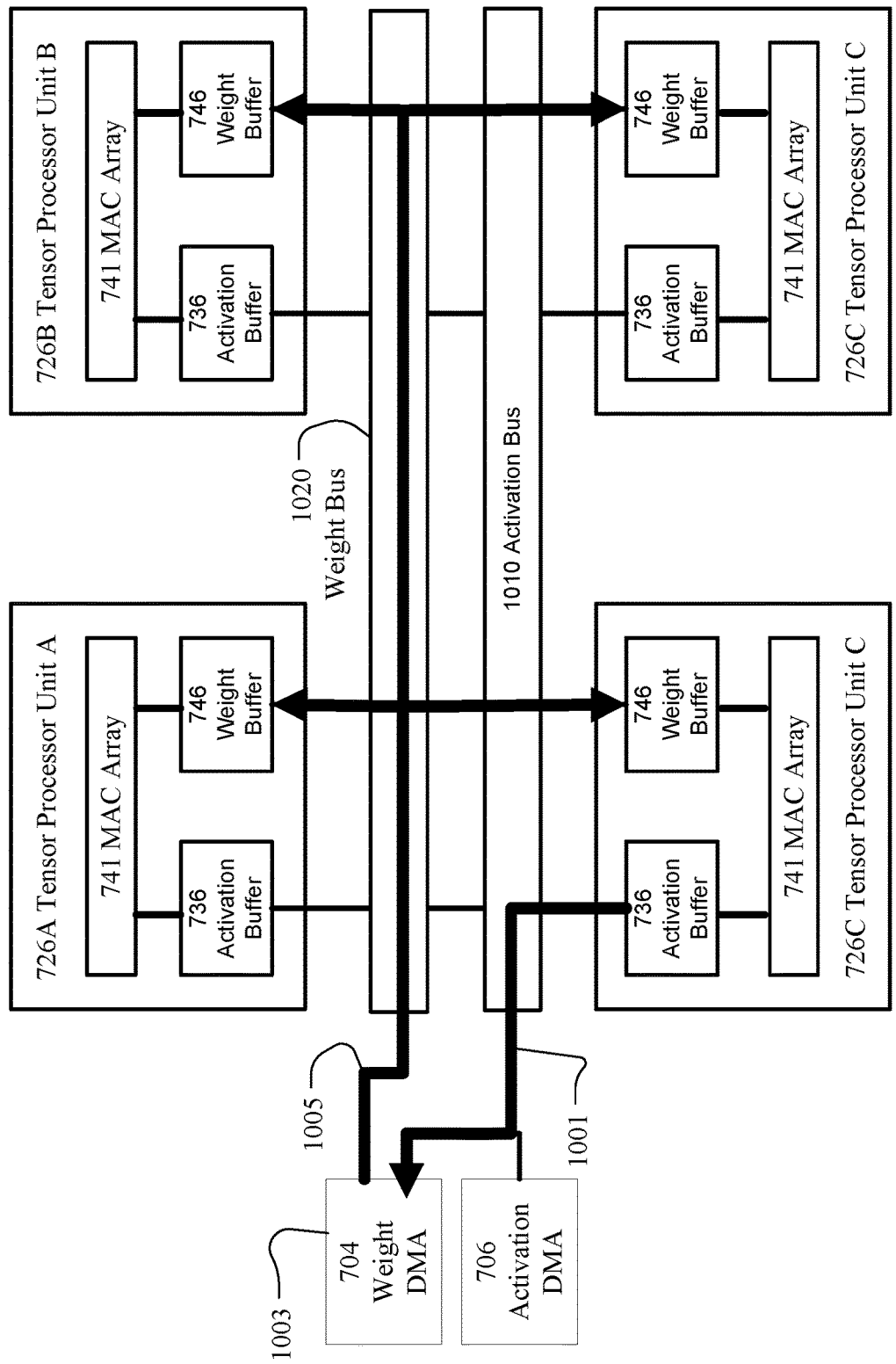
FIG. 10 illustrates an example redistribution of the second activation tensor for a bmm operation.

In particular embodiments, the weight DMA 704 of the computing system 700 may collect the second activation tensor from the activation buffers 736 of the N tensor processor units 726. In particular embodiments, the collected second activation tensor may be in two blocks. The weight DMA 704 may process the collected second activation tensor. The weight DMA 704 may load the second activation tensor into weight buffers 746 of the N tensor processor units. FIG. 10 illustrates an example redistribution of the second activation tensor for a bmm operation. As an example and not by way of limitation, at step 1001, the weight DMA 704 may collect the second activation tensor distributed in the activation buffers 736 of the N tensor processor units 726A-D. Though FIG. 10 illustrates collecting the second activation tensor from only activation buffer 736 of tensor processor unit C 726C for simplicity, the weight DMA 704 may collect the second activation tensor from all the tensor processor units 726 that produced the second activation tensor as an output of a previously operation performed in a distributed manner by the N tensor processor units 726. The collected second activation tensor may be in two blocks. At step 1003, the weight DMA 704 may split each block of the second activation tensor into two tiles as described below. At step 1005, the weight DMA 704 may load the second activation tensor into weight buffers 746 of the N tensor processor units 726A-D. The details will be described below. Although this disclosure describes collecting the second activation tensor from the activation buffers of the N tensor processor units in a particular manner, this disclosure contemplates collecting the second activation tensor from the activation buffers of the N tensor processor units in any suitable manner.

Figure 11:
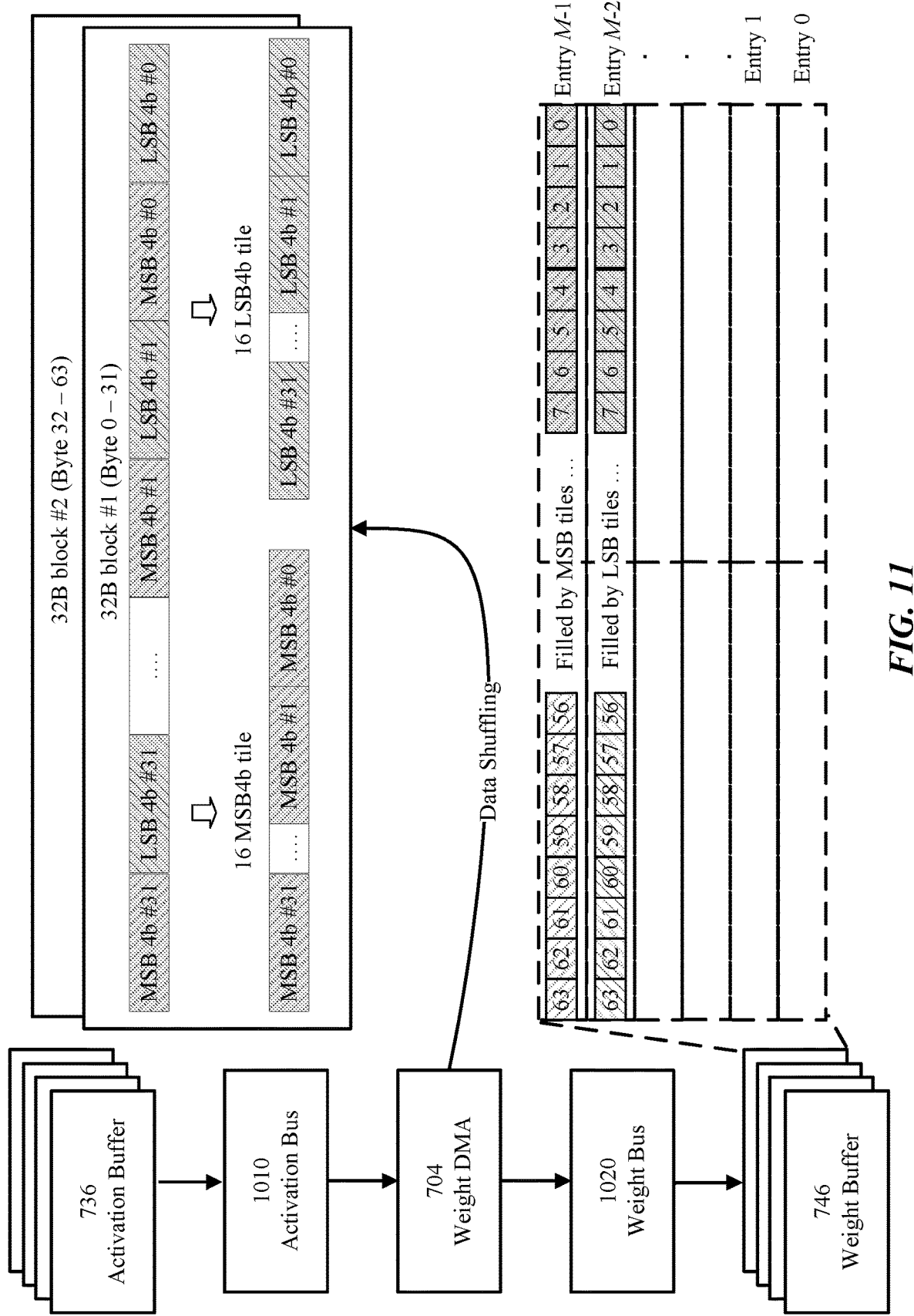
FIG. 11 illustrates an example processing of the second activation tensor at the weight DMA.

To reuse the 32-byte 8-by-8 weight matrix for the second activation tensor, the second activation tensor needs to be 8-by-8 format. Each of the two blocks of the collected second activation tensor may be a tensor of 32 bytes, which is a half of what is needed for the 8-by-8 matrix. In order to fit into the 8-by-8 four-bit weight matrix, the second activation tensor may need to be reformatted into four-bit units. The weight DMA 704 of the computing system 700 may split each of the two blocks of the second activation tensor into a most significant bits (MSB) tile and a least significant bits (LSB) tile. The MSB tile may comprise most significant four bits of each byte in the block. The LSB tile may comprise least significant four bits of each byte in the block. Thus, each MSB tile and LSB tile may comprise 16 bytes. FIG. 11 illustrates an example processing of the second activation tensor at the weight DMA. As an example and not by way of limitation, illustrated in FIG. 11, the weight DMA 704 may collect the second activation tensor in two blocks through the activation bus 1010 at step 1001. In the example illustrated in FIG. 11, the first block comprises bytes 0 through 31, and the second block comprises bytes 32 through 63. At step 1003, the weight DMA 704 may split each block of the second activation tensor into two tiles: an MSB tile comprising most significant four bits from each byte and an LSB tile comprising least significant four bits from each byte. Although this disclosure describes splitting each of the two blocks of the second activation tensor into an MSB tile and an LSB tile in a particular manner, this disclosure contemplates splitting each of the two blocks of the second activation tensor into an MSB tile and an LSB tile in any suitable manner.

In particular embodiments, the weight DMA 704 of the computing system 700 may load the second activation tensor to weight buffers 746 of the N tensor processor units 726 by filling a first entry of each weight buffer 746 of each of the N tensor processor units 726 with contents of the MSB tiles of the two blocks and filling a second entry of the weight buffer 746 with contents of the LSB tiles of the two blocks. For the bmm operations, each entry of the weight buffer 746 may be loaded into the weight matrix of the MAC units in the N tensor processor units 726. As an example and not by way of limitation, continuing with a prior example illustrated in FIG. 11, the weight DMA 704 may load the MSB tiles of the two blocks into entry M−1 of the weight buffer 746 in each of the N tensor processor units 726. The loading may be done through the weight bus 1020. The entry M−1 may be filled by most significant four bits from byte 0 through byte 63 of the second activation tensor. The weight DMA 704 may load the LSB tiles of the two blocks into entry M−2 of the weight buffer 746 in each of the N tensor processor units 726. The loading may be done through the weight bus 1020. The entry M−2 may be filled by least significant four bits from byte 0 through byte 63 of the second activation tensor. For the bmm operation, the most significant four bits from entry M−1 may be loaded into a first 8-by-8 weight matrix, and the least significant four bits from entry M−2 may be loaded into a second 8-by-8 weight matrix. Although this disclosure describes loading the second activation tensor to weight buffers of the N tensor processor units in a particular manner, this disclosure contemplates loading the second activation tensor to weight buffers of the N tensor processor units in any suitable manner.

In particular embodiments, each of the N tensor processor units 726 may produce a first output of the bmm operation by performing a multiplication between a distributed part of the first activation tensor in the activation buffer 736 and the first entry of the weight buffer 746. Each of the N tensor processor units 726 may produce a second output of the bmm operation by performing a multiplication between the distributed part of the first activation tensor in the activation buffer 736 and the second entry of the weight buffer 746. Each of the N tensor processor units may shift the first output by four bits. Each of the N tensor processor units 726 may generate a part of a bmm result by accumulating the shifted first output and the second output. As an example and not by way of limitation, continuing with a prior example illustrated in FIG. 11, a tensor processor unit 726 among the N tensor processor units may have a part of the first activation tensor in the activation buffer 736. The tensor processor unit 726 may load content of entry M−1, the most significant four bits of the second activation tensor, into the first weight matrix. The tensor processor unit 726 may produce a first output of the bmm operation by performing a multiplication between the part of the first activation tensor and the first weight matrix. The tensor processor unit 726 may load content of entry M−2, the least significant four bits of the second activation tensor, into the second weight matrix. The tensor processor unit 726 may produce a second output of the bmm operation by performing a multiplication between the part of the first activation tensor and the second weight matrix. The tensor processor unit 726 may shift the first output by four bits. The tensor processor unit 726 may generate a distributed part of final output of the bmm operation by accumulating the shifted first output and the second output. Although this disclosure describes generating a distributed part of the final output of a bmm operation based on a first activation tensor in the activation buffer and a second activation tensor in the weight buffer in a particular manner, this disclosure contemplates generating a distributed part of the final output of a bmm operation based on a first activation tensor in the activation buffer and a second activation tensor in the weight buffer in any suitable manner.

Figure 12:
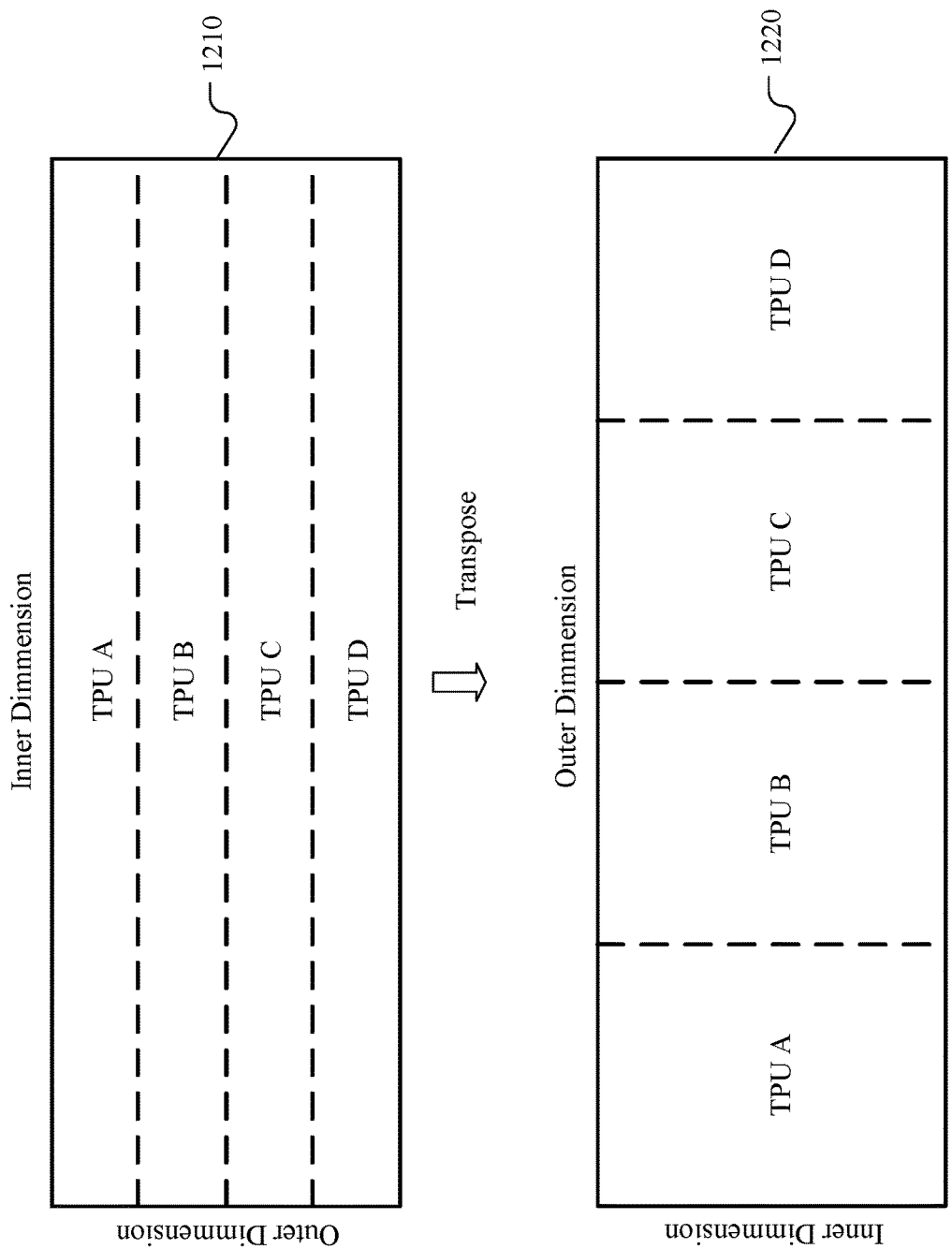
FIG. 12 illustrates an example transpose of the first activation tensor.

In particular embodiments, the computing system 700 may determine that the first activation tensor needs to be transposed before the bmm operation is performed. For example, both the first activation tensor and the second activation tensor for the first bmm operation in the fast attention flow 580 in FIG. 5C have to be transposed. FIG. 12 illustrates an example transpose of the first activation tensor. Rows of an initial first activation tensor 1210 may be distributed into four tensor processor units A, B, C, and D. After transposing the first activation tensor, columns of a transposed first activation tensor 1220 may be distributed into the four tensor processor units.

Figure 13:
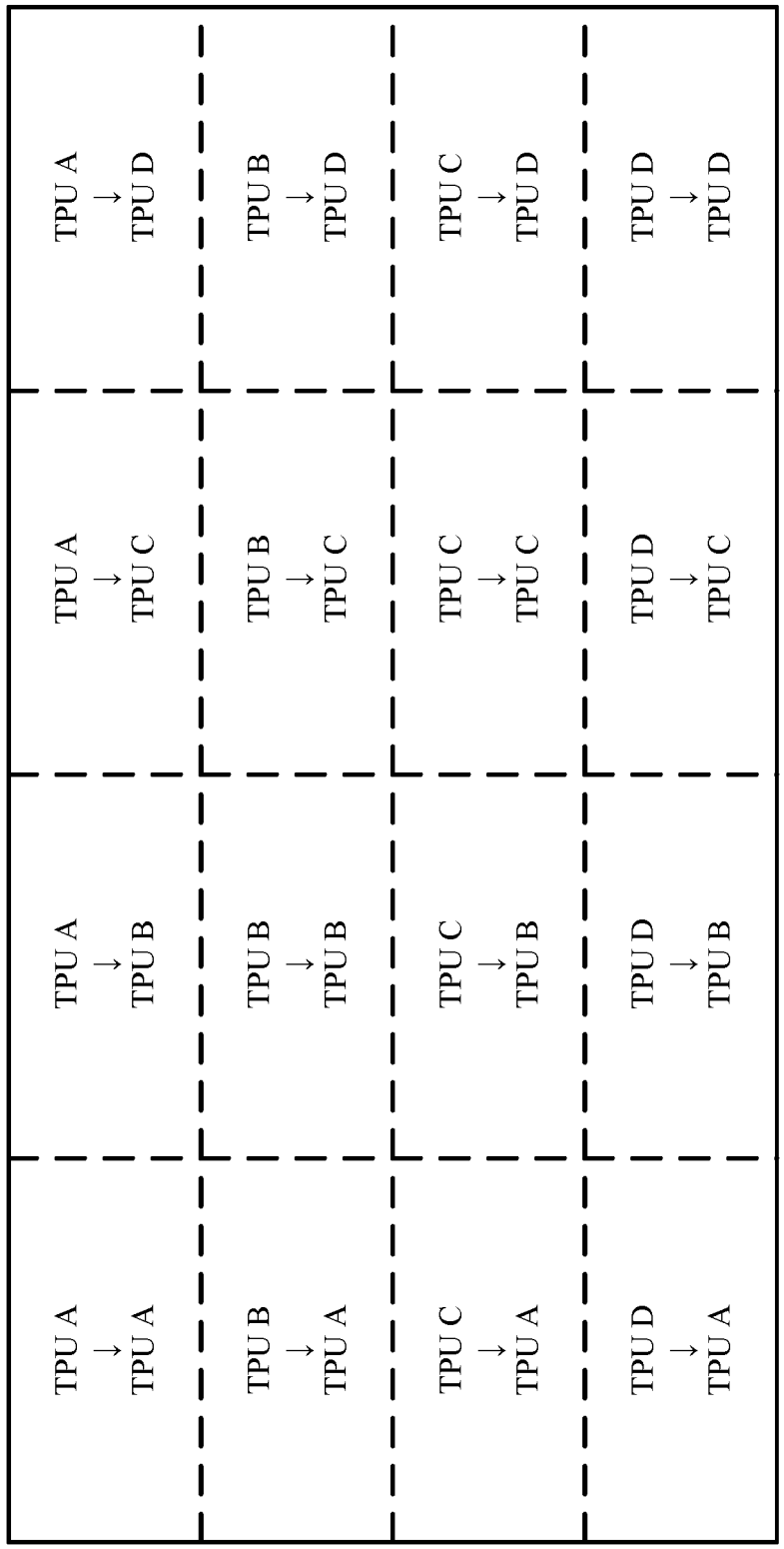
FIG. 13 illustrates an example mapping of the source tensor processor unit and the destination tensor processor unit for each tile when the first activation tensor is transposed.

In particular embodiments, each of the N tensor processor units 726 may divide the distributed part of the first activation tensor in the activation buffer into N tiles along a dimension of the first activation tensor, where N is a number of tensor processor units to perform the bmm in a distributed manner. Each of the N tensor processor units may determine a corresponding destination tensor processor unit 726 for each of the N tiles when the first activation tensor is transposed. FIG. 13 illustrates an example mapping of the source tensor processor unit and the destination tensor processor unit for each tile when the first activation tensor is transposed. Based on the expected transpose of the first activation tensor as illustrated in FIG. 12, each of the N tensor processor unit 726 may divide a distributed part of the first activation tensor in its activation buffer 736 into N tiles. The tensor processor unit 726 may determine a target tensor processor unit 726 for each of the N tiles. As an example and not by way of limitation, illustrated in FIG. 13, tensor processor unit A may determine that the destination of the first tile is tensor processor unit A itself, the destination of the second tile is tensor processor unit B, the destination of the third tile is tensor processor unit C, and the destination of the fourth tile is tensor processor unit D. Similarly, tensor processor unit B, C, and D may determine destination processor units for the tiles they own. Although this disclosure describes determining a destination tensor processor unit for each of the N tiles when the first activation tensor is transposed in a particular manner, this disclosure contemplates determining a destination tensor processor unit for each of the N tiles when the first activation tensor is transposed in any suitable manner.

In particular embodiments, a cluster activation DMA 706 corresponding to a source tensor processor unit 726 may transmit each of the N tiles from the source tensor processor unit 726 to the corresponding destination tensor processor unit 726. The cluster activation DMA may transpose the tile using a transpose buffer 910. As an example and not by way of limitation, continuing with a prior example, when tensor processor unit A belongs to cluster i, the cluster activation DMA 706 of cluster i transmit each of the N tiles to the activation buffer 736 of its target tensor processor unit. While the cluster activation DMA 706 transmits a tile to the activation buffer of the target tensor processor unit 726, the cluster activation DMA 706 transpose the tile using the transpose buffer 910. As another example and not by way of limitation, when tensor processor unit B belongs to cluster j, the cluster activation DMA 706 of cluster j transmit each of the N tiles to the activation buffer 736 of its target tensor processor unit. While the cluster activation DMA 706 transmits a tile to the activation buffer of the target tensor processor unit 726, the cluster activation DMA 706 transpose the tile using the transpose buffer 910. Although this disclosure describes transmitting each of the N tiles of a distributed part of the first activation tensor to the activation buffer of its corresponding tensor processor unit to transpose the first activation tensor in a particular manner, this disclosure contemplates transmitting each of the N tiles of a distributed part of the first activation tensor to the activation buffer of its corresponding tensor processor unit to transpose the first activation tensor in any suitable manner.

In particular embodiments, the source tensor processor unit 726 and the destination tensor processor unit 726 may be identical to each other. In such a case, the tile may be read from a location in the activation buffer 736 into the transpose buffer 910 and the tile in a transposed form may be written back from the transpose buffer 910 to the location in the activation buffer 736. As an example and not by way of limitation, continuing with a prior example, the first tile of the four tiles belonging to tensor processor unit A is supposed to stay in the activation buffer 736 of tensor processor unit A. Yet, the first tile needs to be transposed. The cluster activation DMA 706 of cluster i may load the first tile into the transpose buffer 910. The cluster activation DMA 706 of cluster i may write the transposed first tile to the identical location of the first tile in the activation buffer 736 of tensor processor unit A. Although this disclosure describes transposing a tile using the transpose buffer when a source tensor processor unit and a destination tensor processor unit are identical in a particular manner, this disclosure contemplates transposing a tile using the transpose buffer when a source tensor processor unit and a destination tensor processor unit are identical in any suitable manner.

Figure 14:
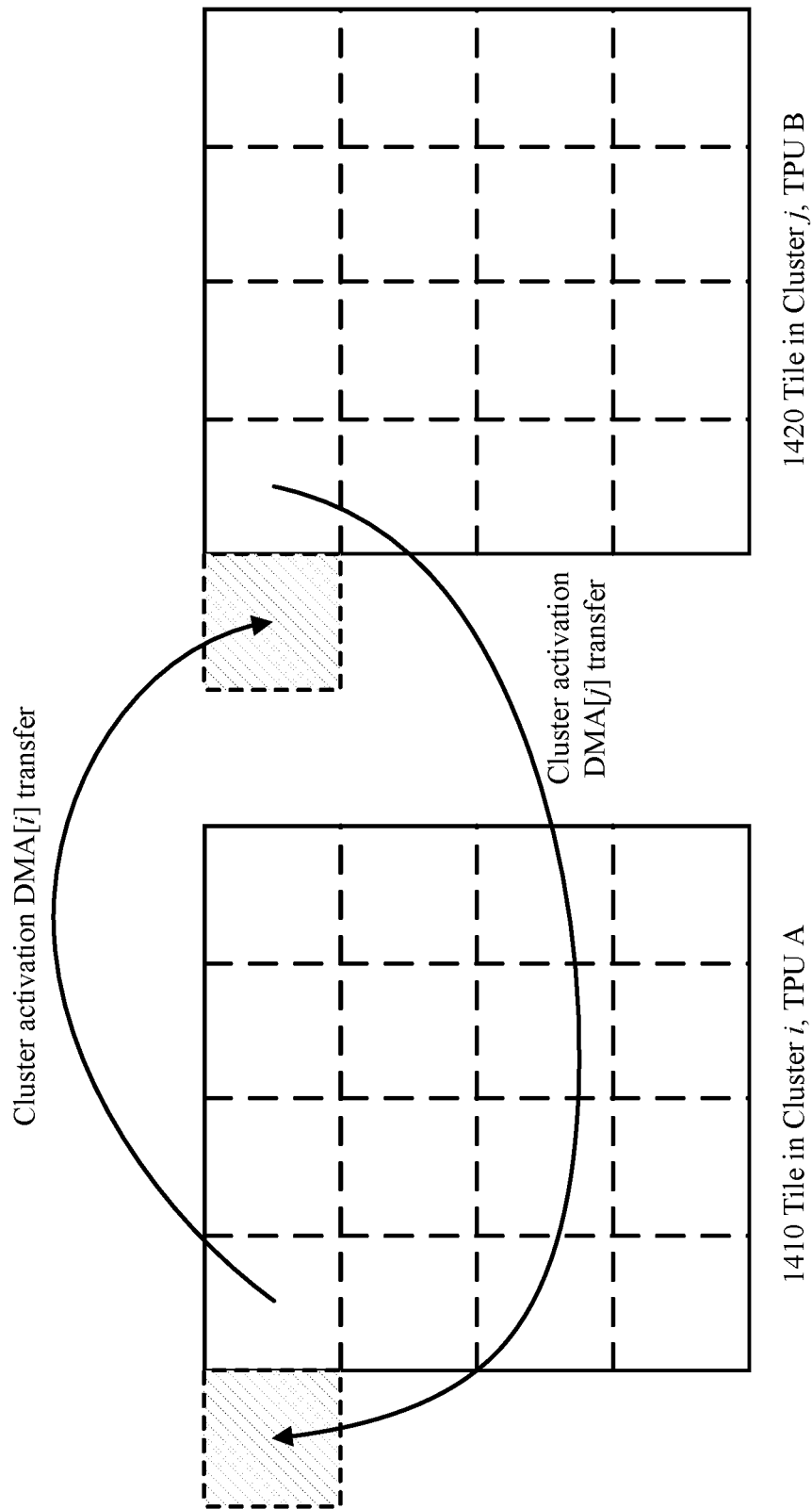
FIG. 14 illustrates an example swapping of tiles between two tensor processor units from different tensor processor clusters.

In particular embodiments, two tiles may be swapped with each other. In such a case, the tiles may be temporarily stored at a temporary location in the activation buffer of a respective destination tensor processor unit 726. A size of the temporary location may equal to a transpose buffer size. In particular embodiments, the two tiles to be swapped are from source tensor processor units 726 of different source tensor processor clusters 724. In such a case, two cluster activation DMAs 706 corresponding to the source tensor processor units 726 may be synchronized at a granularity of a transpose buffer size. FIG. 14 illustrates an example swapping of tiles between two tensor processor units from different tensor processor clusters. As an example and not by way of limitation, illustrated in FIG. 14, a first tile 1410 is in the activation buffer 736 of tensor processor unit A, which belongs to tensor processor cluster i. A second tile 1420 is in the activation buffer 736 of tensor processor unit B, which belongs to tensor processor cluster j. When the first tile 1410 and the second tile 1420 need to be swapped to transpose the first activation tensor, the cluster activation DMA 706 of cluster i and the cluster activation DMA 706 of cluster j may be synchronized at a granularity of the transpose buffer size. The first tile 1410 and the second tile 1420 may be divided at the transpose buffer size and iteratively swapped with each other. While being swapped, each portion of the tiles may be transposed by the transpose buffer 910. A temporary memory space at each activation buffer may be prepared to store the swapped portion of the tiles temporarily. The size of the temporary memory space may equal to the transpose buffer size. Although this disclosure describes swapping tiles between tensor processor units from different tensor processor clusters in a particular manner, this disclosure contemplates swapping tiles between tensor processor units from different tensor processor clusters in any suitable manner.

In particular embodiments, two tiles may be swapped with each other when source tensor processor units 726 of the two tiles are different but belong to a same tensor processor cluster 724. In such a case, the cluster activation DMA 706 may alternately transmit a portion of one tile to a temporary memory space in its destination activation buffer 736. The size of the temporary memory space may equal to the transpose buffer size. As an example and not by way of limitation, continuing with a prior example, tensor processor unit C belongs to tensor processor cluster i. When tensor processor unit A and tensor processor unit C swap tiles, the cluster activation DMA 706 of tensor processor cluster i transmit a portion of each tile one by one. As the swapping occurs in a serial manner, the swapping may take twice as long as a swapping between tensor processor units from different tensor processor clusters. Although this disclosure describes swapping tiles between tensor processor units belonging same tensor processor cluster in a particular manner, this disclosure contemplates swapping tiles between tensor processor units belonging same tensor processor cluster in any suitable manner.

In particular embodiments, the computing system 700 may determine that the second activation tensor needs to be transposed before the bmm operation is performed. As an example and not by way of limitation, the second bmm in flow 570 may require a transposed second activation tensor. Also, the first activation tensor and the second activation tensor for the first bmm operation in flow 580 may need to be transposed. Although this disclosure describes determining that the second activation tensor needs to be transposed for a bmm operation in a particular manner, this disclosure contemplates determining that the second activation tensor needs to be transposed for a bmm operation in any suitable manner.

Figures 15A, 15B:
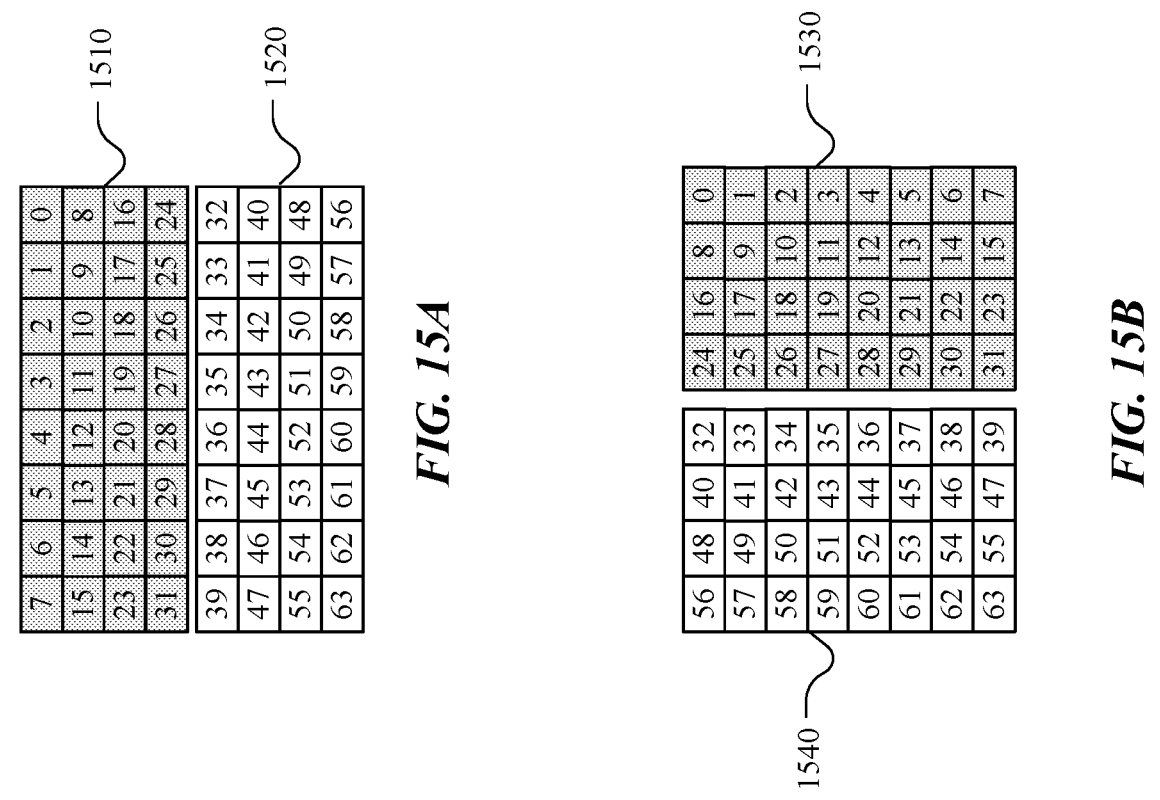

Each of the two blocks of the second activation tensor may be one half of the second activation tensor. FIG. 15A illustrates a second activation tensor in two blocks. The first block 1510 comprises first four rows of the second activation tensor with bytes 0-31. The second block 5120 comprises last four rows of the second activation tensor with bytes 32-63. FIG. 15B illustrates a transposed second activation tensor in two blocks. The first block 1530 comprises first four columns of the transposed second activation tensor with bytes 0-31. The second block 1540 comprises last four columns of the transposed second activation tensor with bytes 32-63. Each row of the transposed second activation tensor in FIG. 15B comprises a half from the first block 1530 and another half from the second block 1540. For example, the first row comprises bytes 0, 8, 16, and 24 from the first block 1530 and bytes 32, 40, 48, and 56 from the second block 1540. As an entry of a weight buffer 746 is loaded to a weight matrix row by row, byte orders in each block may need to be shuffled to transpose the second activation tensor. Also, four bytes from each block may be concatenated to form a row in the transposed second activation tensor.

Figure 16:
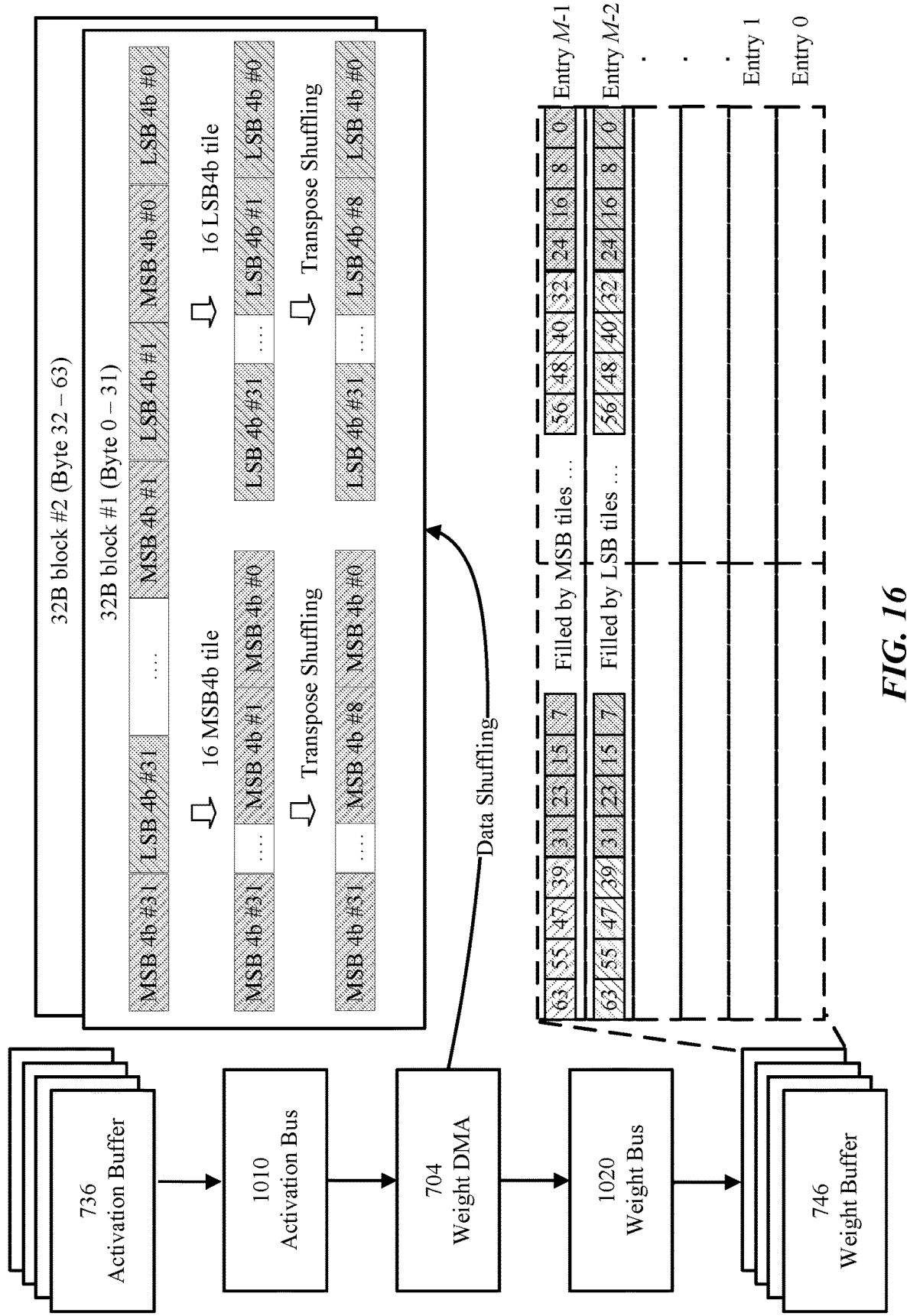
FIG. 16 illustrates an example processing of the second activation tensor at the weight DMA to transpose the second activation tensor.

In particular embodiments, the computing system 700 may determine that the second activation tensor needs to be transposed for a bmm operation. In such a case, while splitting each of the two blocks of the second activation tensor into the MSB tile and the LSB tile, the weight DMA may reorder the MSB tile and the LSB tile in a corresponding transposed order. FIG. 16 illustrates an example processing of the second activation tensor at the weight DMA to transpose the second activation tensor. As an example and not by way of limitation, illustrated in FIG. 16, the weight DMA 704 may, at step 1003, split each block of the second activation tensor into an MSB tile and an LSB tile. The weight DMA 704 may shuffle the MSB tile and the LSB tile of each block in a corresponding transposed order. Each tile of the first block may be reordered into, from the lowest to highest, 0, 8, 16, 24, 1, 9, 17, 25, ..., 7, 15, 23, and 31. Each tile of the second block may be reordered into each block into, from the lowest to highest, 32, 40, 48, 56, 33, 41, 49, 57, ..., 39, 47, 55, and 63. In particular embodiments, the weight DMA 704 may reorder each block and split the reordered blocks into an MSB tile and an LSB tile. Although this disclosure describes recording each block of the second activation tensor in a corresponding transposed order in a particular manner, this disclosure contemplates recording each block of the second activation tensor in a corresponding transposed order in any suitable manner.

While filling the first entry of the weight buffer 746 of a tensor processor unit 726 with the contents of the MSB tiles of the two blocks, the weight DMA 704 may split each of the MSB tiles into multiples of k most-significant-four-bit units, where k is a half of a first dimension of the transposed second activation tensor. To transpose the second activation tensor, the weight DMA 704 may fill the first entry of the weight buffer 746 by alternately filling the k most-significant-four-bit units from each of the MSB tiles. As an example and not by way of limitation, continuing with a prior example, the weight DMA 704 may fill entry M−1 of the weight buffer 746 with four MSB 4 bits from bytes 0, 8, 16, and 24 of the first block. The weight DMA 704 may fill next four elements in entry M−1 with four MSB 4 bits from bytes 32, 40, 48, and 56 of the second block. The weight DMA 704 may continue filling entry M−1 by alternately filling next 4 MSB elements from the each transposed ordered block. In particular embodiments, the weight DMA 704 may fill entry M−1 of the weight buffer 746 at a single cycle because the weight buffer 746 is a D Flip-Flop memory buffer. As explained with FIG. 15 above, the weight matrix loaded from the content of entry M−1 may be an MSB portion of the transposed second activation tensor. Although this disclosure describes loading MSB tiles of the transposed second activation tensor into an entry of the weight buffer in a particular manner, this disclosure contemplates loading MSB tiles of the transposed second activation tensor into an entry of the weight buffer in any suitable manner.

While filling the second entry of the weight buffer 746 of a tensor processor unit 726 with the contents of the LSB tiles of the two blocks, the weight DMA 704 may split each of the LSB tiles into multiples of k least-significant-four-bit units, where k is a half of a first dimension of the transposed second activation tensor. The weight DMA 704 may fill the second entry of the weight buffer by alternately filling the k least-significant-four-bit units from each of the LSB tiles. As an example and not by way of limitation, continuing with a prior example, the weight DMA 704 may fill entry M−2 of the weight buffer 746 with four LSB 4 bits from bytes 0, 8, 16, and 24 of the first block. The weight DMA 704 may fill next four elements in entry M−2 with four LSB 4 bits from bytes 32, 40, 48, and 56 of the second block. The weight DMA 704 may continue filling entry M−2 by alternately filling next 4 LSB elements from the each transposed ordered block. The weight matrix loaded from the content of entry M−2 may be an LSB portion of the transposed second activation tensor. Although this disclosure describes loading LSB tiles of the transposed second activation tensor into an entry of the weight buffer in a particular manner, this disclosure contemplates loading LSB tiles of the transposed second activation tensor into an entry of the weight buffer in any suitable manner.

Figure 17:
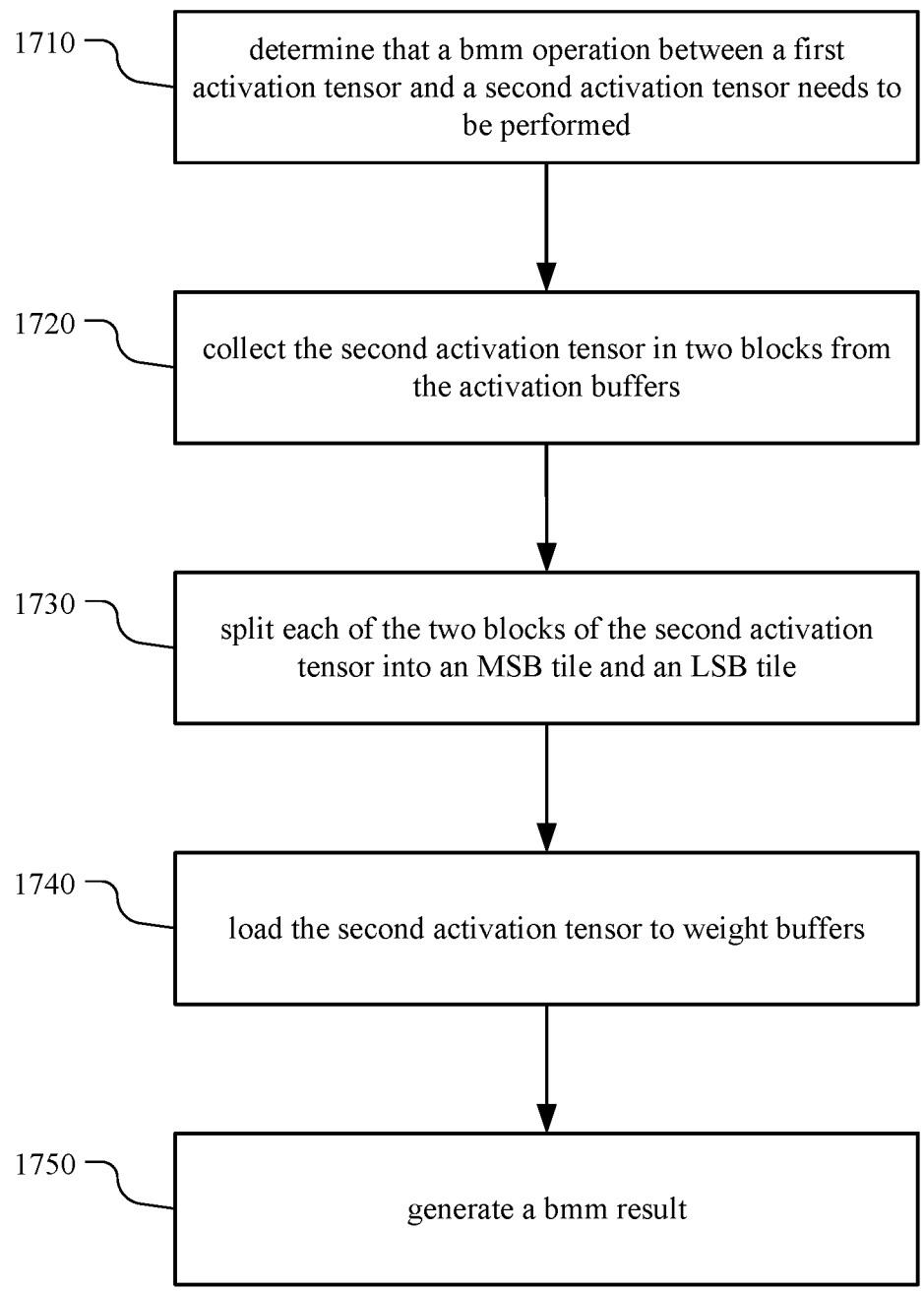
FIG. 17 illustrates an example method for performing a bmm operation between a first activation tensor and a second activation tensor.

FIG. 17 illustrates an example method 1700 for performing a bmm operation between a first activation tensor and a second activation tensor. The method may begin at step 1710, where a computing system may determine that a bmm operation between a first activation tensor and a second activation tensor needs to be performed. The first activation tensor and the second activation tensor may be distributed in activation buffers of N tensor processor units. At step 1720, a weight DMA of the computing system may collect the second activation tensor in two blocks from the activation buffers of the N tensor processor units. At step 1730, the weight DMA of the computing system may split each of the two blocks of the second activation tensor into an MSB tile and an LSB tile. The MSB tile may comprise most significant four bits of each byte in the block. The LSB tile may comprise least significant four bits of each byte in the block. At step 1740, the weight DMA of the computing system may load the second activation tensor to weight buffers of the N tensor processor units by filling a first entry of each weight buffer of each of the N tensor processor units with contents of the MSB tiles of the two blocks and filling a second entry of the weight buffer with contents of the LSB tiles of the two blocks. At step 1750, the computing system may generate a bmm result using the first activation tensor distributed in the activation buffers of the N tensor processor units and the second activation tensor in the weight buffers of the N tensor processor units. Particular embodiments may repeat one or more steps of the method of FIG. 17, where appropriate. Although this disclosure describes and illustrates particular steps of the method of FIG. 17 as occurring in a particular order, this disclosure contemplates any suitable steps of the method of FIG. 17 occurring in any suitable order. Moreover, although this disclosure describes and illustrates an example method for performing a bmm operation between a first activation tensor and a second activation tensor including the particular steps of the method of FIG. 17, this disclosure contemplates any suitable method for performing a bmm operation between a first activation tensor and a second activation tensor including any suitable steps, which may include all, some, or none of the steps of the method of FIG. 17, where appropriate. Furthermore, although this disclosure describes and illustrates particular components, devices, or systems carrying out particular steps of the method of FIG. 17, this disclosure contemplates any suitable combination of any suitable components, devices, or systems carrying out any suitable steps of the method of FIG. 17.

Figure 18:
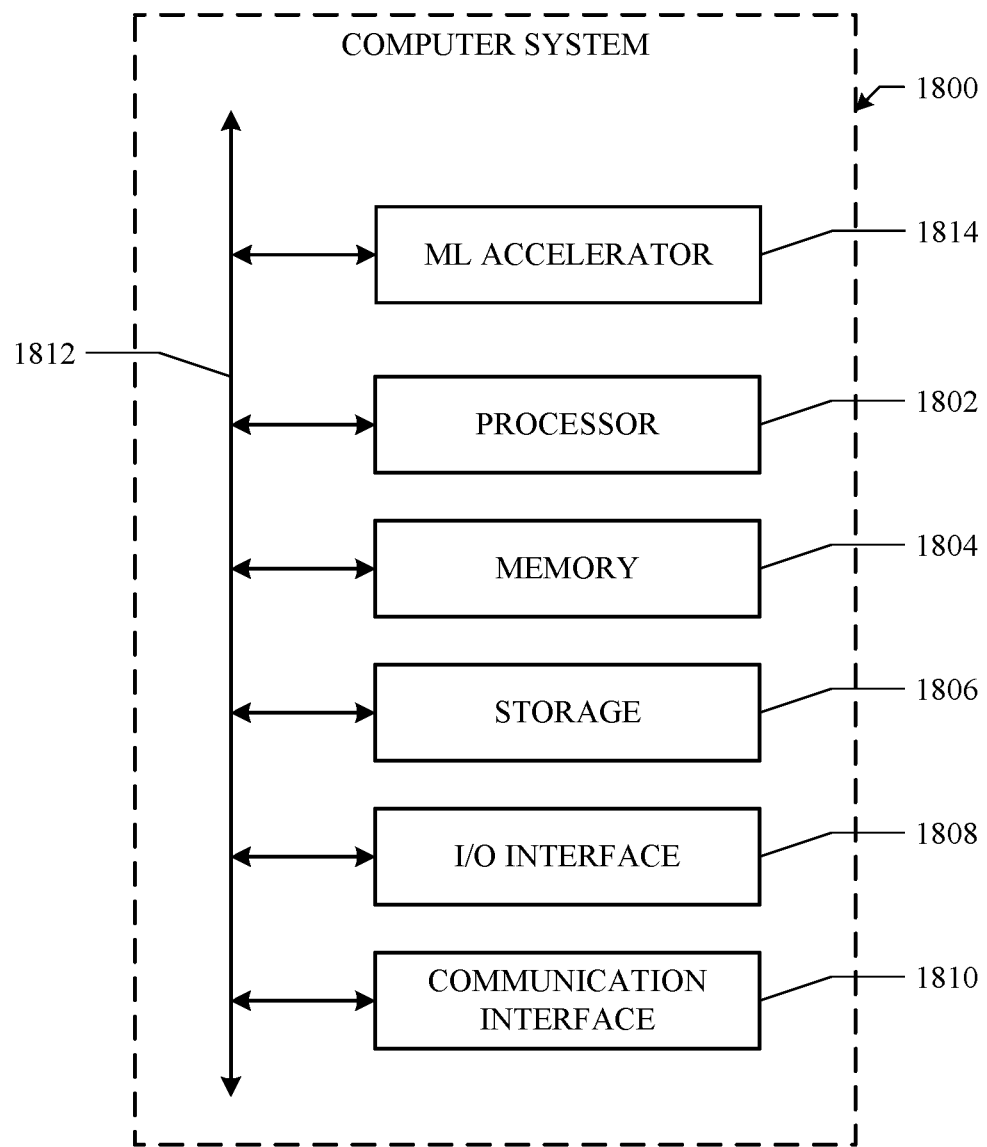
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812, and an ML accelerator 1814. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, ML accelerator 1814 may be similar to ML accelerator 620 illustrated in FIG. 6, or ML accelerator 700 illustrated in FIG. 7A. As such, particular instructions of computer programs for machine learning applications that use a convolutional neural network may be translated into tensor instructions for execution by various computational elements of ML accelerator 1814, as described herein. In particular embodiments, ML accelerator 1814 may be implemented using hardware and/or software elements in any suitable combination. As described herein, ML accelerator 1814 may include multiple tensor processor clusters and underlying tensor processors, each of which may include local memory for storing input features, weights for 2D kernels of various multi-dimensional filters, and/or output features of various convolution operations (not shown in FIG. 18). In particular embodiments, these local memories may be loaded from storage 1806, memory 1804, or from another source (such as, for example, another computer system 1800). The use of ML accelerator 1814 to execute the tensor instructions may improve the overall performance and resource utilization of computer system 1800 for those applications when compared to executing them using processor 1802 or using an existing ML accelerator.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computing system for accelerating machine-learning computations comprising:
   a plurality of tensor processor clusters, each comprising:
      a plurality of tensor processor units;
      an activation direct-memory access (DMA); and
      a weight DMA; and
   an instruction master providing instructions operable when executed by the plurality of tensor processor clusters to cause the computing system to:
      determine that a batch matrix multiplication (bmm) operation between a first activation tensor and a second activation tensor needs to be performed, wherein the first activation tensor and the second activation tensor are distributed in activation buffers of N tensor processor units;
      collect, at the weight DMA, the second activation tensor in two blocks from the activation buffers of the N tensor processor units;
      split, at the weight DMA, each of the two blocks of the second activation tensor into a most significant bits (MSB) tile and a least significant bits (LSB) tile, wherein the MSB tile comprises most significant four bits of each byte in the block, and wherein the LSB tile comprises least significant four bits of each byte in the block;
      load the second activation tensor to weight buffers of the N tensor processor units by filling a first entry of each weight buffer of each of the N tensor processor units with contents of the MSB tiles of the two blocks and filling a second entry of the weight buffer with contents of the LSB tiles of the two blocks; and
      generate a bmm result using the first activation tensor distributed in the activation buffers of the N tensor processor units and the second activation tensor in the weight buffers of the N tensor processor units.

2. The computing system of claim 1, wherein the instructions are further operable when executed by the plurality of tensor processor clusters to:
   determine that the first activation tensor needs to be transposed before the bmm operation is performed;
   divide, at each of the N tensor processor units, the distributed part of the first activation tensor in the activation buffer into N tiles along a dimension of the first activation tensor, wherein N is a number of tensor processor units to perform the bmm operation in a distributed manner;
   determine, for each of the N tiles at each of the N tensor processor units, a corresponding destination tensor processor unit; and
   transmit each of the N tiles from each of the N tensor processor units to the corresponding destination tensor processor unit.

3. The computing system of claim 2, wherein a cluster activation DMA corresponding to a source tensor processor unit is used for transmitting a tile from the source tensor processor unit to a destination tensor processor unit, and wherein the cluster activation DMA transposes the tile using a transpose buffer.

4. The computing system of claim 3, wherein the tile is read from a location in the activation buffer into the transpose buffer and the tile in a transposed form is written back to the location in the activation buffer when the source tensor processor unit and the destination tensor processor unit are identical to each other.

5. The computing system of claim 3, wherein, when two tiles are swapped with each other, the tiles are temporarily stored at a temporary location in the activation buffer of a respective destination tensor processor unit.

6. The computing system of claim 5, wherein a size of the temporary location equals to a transpose buffer size.

7. The computing system of claim 5, wherein, when the two tiles are from source tensor processor units of different source tensor processor clusters, two cluster activation DMAs corresponding to the source tensor processor units are synchronized at a granularity of a transpose buffer size.

8. The computing system of claim 1, wherein the instructions are further operable when executed by the plurality of tensor processor clusters to determine that the second activation tensor needs to be transposed before the bmm operation is performed.

9. The computing system of claim 8, wherein each of the two blocks is one half of the second activation tensor, and wherein splitting the each of the two blocks of the second activation tensor into the MSB tile and the LSB tile comprising reordering the MSB tile and the LSB tile in a corresponding transposed order.

10. The computing system of claim 8, wherein filling the first entry of the weight buffer of a tensor processor unit with the contents of the MSB tiles of the two blocks comprises:
    splitting each of the MSB tiles into multiples of k most-significant-four-bit units, wherein k is a half of a first dimension of the transposed second activation tensor; and
    filling the first entry of the weight buffer by alternately filling the k most-significant-four-bit units from each of the MSB tiles.

11. The computing system of claim 8, wherein filling the second entry of the weight buffer of a tensor processor unit with the contents of the LSB tiles of the two blocks comprises:
    splitting each of the LSB tiles into multiples of k least-significant-four-bit units, wherein k is a half of a first dimension of the transposed second activation tensor; and
    filling the second entry of the weight buffer by alternately filling the k least-significant-four-bit units from each of the LSB tiles.

12. The computing system of claim 1, wherein the first activation tensor and the second activation tensor are output of respective operations that are performed by the N tensor processor units in distributed manners.

13. The computing system of claim 1, wherein generating the bmm result comprises:
    producing, at each of the N tensor processor units, a first output of the bmm operation by performing a multiplication between a distributed part of the first activation tensor in the activation buffer and the first entry of the weight buffer;
    producing, at each of the N tensor processor units, a second output of the bmm operation by performing a multiplication between the distributed part of the first activation tensor in the activation buffer and the second entry of the weight buffer;

shifting, at each of the N tensor processor units, the first output by four bits; and accumulating, at each of the N tensor processor units, the shifted first output and the second output.

14. A One or more computer-readable non-transitory storage media embodying software that is operable when executed to, by a computing system for accelerating machine-learning computations comprising a plurality of tensor processor clusters, each comprising a plurality of tensor processor units, an activation direct-memory access (DMA), and a weight DMA:

determine that a batch matrix multiplication (bmm) operation between a first activation tensor and a second activation tensor needs to be performed, wherein the first activation tensor and the second activation tensor are distributed in activation buffers of N tensor processor units;

collect, at the weight DMA, the second activation tensor in two blocks from the activation buffers of the N tensor processor units;

split, at the weight DMA, each of the two blocks of the second activation tensor into a most significant bits (MSB) tile and a least significant bits (LSB) tile, wherein the MSB tile comprises most significant four bits of each byte in the block, and wherein the LSB tile comprises least significant four bits of each byte in the block;

load the second activation tensor to weight buffers of the N tensor processor units by filling a first entry of each weight buffer of each of the N tensor processor units with contents of the MSB tiles of the two blocks and filling a second entry of the weight buffer with contents of the LSB tiles of the two blocks; and generate a bmm result using the first activation tensor distributed in the activation buffers of the N tensor processor units and the second activation tensor in the weight buffers of the N tensor processor units.

15. The media of claim 14, wherein the software is further operable when executed by the computing system to:

determine that the first activation tensor needs to be transposed before the bmm operation is performed;

divide, at each of the N tensor processor units, the distributed part of the first activation tensor in the activation buffer into N tiles along a dimension of the first activation tensor, wherein N is a number of tensor processor units to perform the bmm operation in a distributed manner;

determine, for each of the N tiles at each of the N tensor processor units, a corresponding destination tensor processor unit; and transmit each of the N tiles from each of the N tensor processor units to the corresponding destination tensor processor unit.

16. The media of claim 15, wherein a cluster activation DMA corresponding to a source tensor processor unit is used for transmitting a tile from the source tensor processor unit to a destination tensor processor unit, and wherein the cluster activation DMA transposes the tile using a transpose buffer.

17. The media of claim 16, wherein the tile is read from a location in the activation buffer into the transpose buffer and the tile in a transposed form is written back to the location in the activation buffer when the source tensor processor unit and the destination tensor processor unit are identical to each other.

18. The media of claim 16, wherein, when two tiles are swapped with each other, the tiles are temporarily stored at a temporary location in the activation buffer of a respective destination tensor processor unit.

19. The media of claim 18, wherein a size of the temporary location equals to a transpose buffer size.

20. A method comprising, by a computing system for accelerating machine-learning computations comprising a plurality of tensor processor clusters, each comprising a plurality of tensor processor units, an activation direct-memory access (DMA), and a weight DMA:

determining that a batch matrix multiplication (bmm) operation between a first activation tensor and a second activation tensor needs to be performed, wherein the first activation tensor and the second activation tensor are distributed in activation buffers of N tensor processor units;

collecting, at the weight DMA, the second activation tensor in two blocks from the activation buffers of the N tensor processor units;

splitting, at the weight DMA, each of the two blocks of the second activation tensor into a most significant bits (MSB) tile and a least significant bits (LSB) tile, wherein the MSB tile comprises most significant four bits of each byte in the block, and wherein the LSB tile comprises least significant four bits of each byte in the block;

loading the second activation tensor to weight buffers of the N tensor processor units by filling a first entry of each weight buffer of each of the N tensor processor units with contents of the MSB tiles of the two blocks and filling a second entry of the weight buffer with contents of the LSB tiles of the two blocks; and generating a bmm result using the first activation tensor distributed in the activation buffers of the N tensor processor units and the second activation tensor in the weight buffers of the N tensor processor units.

* * * * *